(12) United States Patent
Wiest et al.

(10) Patent No.: US 10,011,513 B2
(45) Date of Patent: Jul. 3, 2018

(54) APPARATUSES AND METHODS FOR FORMING HOLLOW SPHERES

(71) Applicant: The United States of America as represented by the Secretary of the Navy, Washington, DC (US)

(72) Inventors: Aaron Wiest, Norco, CA (US); Craig A MacDougall, Norco, CA (US); Steven J Rogers, Phelan, CA (US); Robert A Heller, Corona, CA (US); Matthew P Khalil, Corona, CA (US); Matthew T McCormick, Angelus Oaks, CA (US); Dylan R Switzer, Riverside, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/146,953

(22) Filed: May 5, 2016

(65) Prior Publication Data

US 2017/0057857 A1    Mar. 2, 2017

Related U.S. Application Data

(60) Provisional application No. 62/158,076, filed on May 7, 2015.

(51) Int. Cl.
| | | |
|---|---|---|
| *C03B 19/10* | (2006.01) | |
| *B22D 25/00* | (2006.01) | |
| *B22D 23/06* | (2006.01) | |

(52) U.S. Cl.
CPC .......... *C03B 19/1075* (2013.01); *B22D 23/06* (2013.01); *B22D 25/00* (2013.01); *Y02P 40/57* (2015.11)

(58) Field of Classification Search
CPC ....... C03B 19/00; C03B 19/10; C03B 19/107; C03B 19/1075; B29C 49/0042; B01J 13/04; B22F 1/0051; B22D 25/00
See application file for complete search history.

(56) References Cited

U.S. PATENT DOCUMENTS

| | | | | |
|---|---|---|---|---|
| 4,162,282 A | * | 7/1979 | Fulwyler | B01J 13/04 |
| | | | | 252/635 |
| 4,279,632 A | * | 7/1981 | Frosch | B01J 13/04 |
| | | | | 264/443 |

(Continued)

FOREIGN PATENT DOCUMENTS

JP           60151234 A  *  8/1985  ......... C03B 19/1075

OTHER PUBLICATIONS

Avallone et al., "Marks' Standard Handbook for Mechanical Engineers", 9th edition, The McGraw-Hill Companies, 1969. (presented in 7 parts).

(Continued)

*Primary Examiner* — Lisa L Herring
(74) *Attorney, Agent, or Firm* — Christopher A. Monsey

(57) ABSTRACT

Apparatuses and methods of forming hollow spheres are provided. Hollow sphere forming apparatus incorporate a bubble forming nozzle assembly in which outlets for gas and liquid materials are disposed substantially coaxially. The relative positions of the gas and liquid outlets are adjustable in at least one dimension (e.g., axially, radially or angularly relative to each other), such that a more uniform annular exit region for the gas and liquid outlets may be configured, such that more symmetric bubbles may be formed thus reducing the rejection rate in solidified bubbles due to asymmetry or decentering of entrapped gas.

26 Claims, 13 Drawing Sheets

(56) References Cited

U.S. PATENT DOCUMENTS

| | | | |
|---|---|---|---|
| 4,322,378 A | 3/1982 | Hendricks et al. | |
| 4,344,787 A | 8/1982 | Beggs et al. | |
| 4,548,196 A * | 10/1985 | Torobin | B01J 13/04 126/654 |
| 4,643,854 A | 2/1987 | Kendall et al. | |
| 4,670,035 A * | 6/1987 | Lee | B01J 13/04 264/5 |
| 4,671,909 A | 6/1987 | Torobin et al. | |
| 4,777,154 A * | 10/1988 | Torobin | B01J 13/04 264/129 |
| 4,806,357 A | 2/1989 | Garrett et al. | |
| 4,867,931 A * | 9/1989 | Cochran, Jr. | B01J 13/04 264/12 |
| 4,960,351 A * | 10/1990 | Kendall, Jr. | B01J 13/04 425/174.8 E |
| 5,227,239 A | 7/1993 | Henning Sten et al. | |
| 7,730,746 B1 * | 6/2010 | Pavliscak | B22F 9/08 264/4 |

OTHER PUBLICATIONS

Ghosh et al., "Uniaxial quasistatic and dynamic compressive response of foamsmade from hollow glass microspheres", Journal of the European Ceramic Society, 2015.

Johnson et al., "The use of metallic glasses in fabrication of ICF targets", J. Vac. Sci. Technol. A, Jul.-Sep. 1983, vol. 1, No. 3, pp. 1568-1570.

Kendall, "Experiments on annular liquid jet instability and on the formation of liquid shells", Phys. fluids, Jul. 1986, 29(7), pp. 2086-2094.

Kendall et al., "Metal shell technology based upon hollow jet instability", J. Vac. Sci. Technol., Apr. 1982, vol. 20, No. 4, pp., 1091-1093.

Lee et al., "A theoretical model for the annular jet instability", Physics of Fluids (1958-1988) 29, 2076 (1986); doi: 10.1063/1.865594.

Lee et al., "Spheres of the metallic glass Au55 Pb22.5 Sb22.5 and their surface characteristics", Appl. Phys. Lett., Mar. 1, 1982, vol. 40, No. 5, pp. 382-384.

Lee et al., "Sensational spherical shells", Aerospace America, Jan. 1986, pp. 1-4.

Nadler et al., "Aluminum Hollow Sphere Processing", Materials Science Forum vols. 331-337 (2000) pp. 495-500.

Vu et al., "Production of Hollow Spheres of Eutectic Tin-Lead Solder through a Coaxial Nozzle", Journal of Solid Mechanics and Materials Engineering, Jul. 29, 2010, vol. 4, No. 10-0313, pp. 1530-1538.

Wiest et al., "Optimization of cellular solids for energy absorption", Scripta Materialia, 2014.

Wilcox et al., "Microsphere fabrication and Applications: An Overview", Mat. Res. Symp. Proc. 1995, vol. 372.

* cited by examiner

Fig. 1b   Fig. 1c   Fig. 1d   Fig. 1e
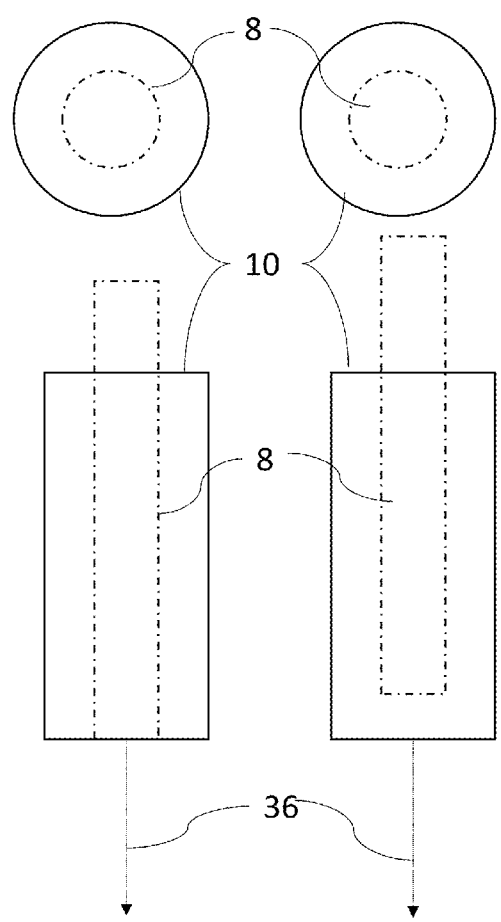
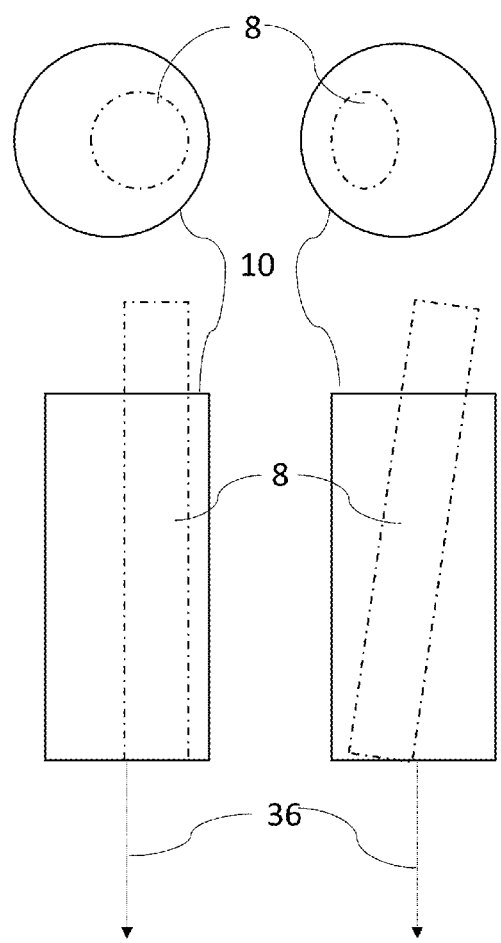

APPARATUSES AND METHODS FOR FORMING HOLLOW SPHERES

STATEMENT OF RELATED APPLICATIONS

The current application claims priority to U.S. Provisional Patent Application No. 62/158,076, filed May 7, 2015, entitled "APPARATUSES AND METHODS FOR FORMING HOLLOW SPHERES," the disclosure of which is incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,235) is assigned to the United States Government and is available for licensing for commercial purposes.

FIELD OF THE INVENTION

The present invention relates to a bubble forming system, and more particularly to methods and apparatus for forming hollow spheres of amorphous and metallic materials.

BACKGROUND OF THE INVENTION

Hollow spheres are useful across a wide-variety of industries. Various systems currently exist to form such hollow spheres. However, existing systems suffer from various disadvantages and are not easily adjustable, scalable, or manufacturable.

SUMMARY OF THE INVENTION

Many embodiments are directed to a hollow sphere forming apparatus including:
  a heatable liquid material reservoir defining a heatable inner volume;
  at least one fluid outlet configured such that the inner opening of said fluid outlet is in fluid communication with the heatable inner volume and the outer opening of said fluid outlet is in fluid communication with the exterior of the heatable inner volume;
  at least one upper nozzle plate at least partially disposed within the heatable inner volume above the fluid outlet, the upper nozzle plate having at least one tube retaining receptacle disposed therethrough;
  at least one gas tube in fluid communication with a gas supply exterior to the heatable inner volume and secured within the tube retaining passage such that at least an outlet end of the gas tube is disposed within the fluid outlet such that an annular opening is formed between an outer wall of the gas tube and an inner wall of the fluid outlet, and wherein the upper nozzle plate is movably mounted within the heatable liquid material reservoir such that the radial position of the gas tube relative to the fluid outlet is adjustable; and
  at least three spacers disposed between the upper nozzle plate and the fluid outlet, and wherein the height of at least two of the spacers are separably adjustable such that the axial and angular position of the gas tube relative to the fluid outlet is adjustable.

In other embodiments the apparatus further includes a cooling tube having at least one opening disposed adjacent the outer opening of the fluid outlet, and being of sufficient height to allow the spheres to cool and solidify therein during transit therethrough. In many such embodiments the cooling tube further comprises at least one device disposed along the length thereof selected from the group consisting of gauges, viewports, heating elements, cooling elements, valves, gas feed-throughs, electrical feed-throughs, and sealable openings.

In still other embodiments the apparatus further includes a cooling vessel defining a coolable inner volume, and wherein one or more elements of the apparatus are disposed within the coolable inner volume.

In yet other embodiments the at least one fluid outlet is disposed in a bottom nozzle plate disposed adjacent to the outer walls of the liquid material reservoir. In many such embodiments a pressurizable seal is formed between the bottom nozzle plate and the liquid material reservoir, the pressurizable seal being selected from the group consisting of gaskets, knife edges, and mateable surfaces.

In still yet other embodiments the spacers are one or more washers or threaded rods.

In still yet other embodiments one or more components of the apparatus disposed within the heatable inner volume are formed from a material selected from the group consisting of tungsten, molybdenum, platinum, rhodium, tantalum, graphite or alloys or oxides or carbides of the materials listed.

In still yet other embodiments at least a portion of the gas tube is press fit into the upper nozzle plate.

In still yet other embodiments the gas tube comprises a plurality of separate sections, and wherein at least two sections of the gas tube are fluidly interconnected in the upper nozzle plate. In some such embodiments at least one section of the gas tube is press fit into the upper nozzle plate and wherein at least one section of the gas tube is threaded into the upper nozzle plate. In other such embodiments the upper nozzle plate comprises at least two separate and adjacently disposed interconnected plates.

In still yet other embodiments the upper nozzle plate is secured to the liquid material reservoir in which it is co-located. In some such embodiments the upper nozzle plate is secured via at least one threaded connector that passes through at least one thru hole disposed therethrough, and wherein the diameter of the at least one thru hole is larger than a diameter of the threaded connector used therewith.

In still yet other embodiments the heatable liquid material reservoir is adapted to maintain a temperature and liquid material contained therein at least 900 C.

In still yet other embodiments the heatable liquid material reservoir is surrounded by at least one of a foil or at least one layer of insulation, either or both having a temperature resistance greater than at least from 900 C.

Many other embodiments are directed to a hollow sphere forming apparatus including:
  a pressurizable vessel defining a pressurizable inner volume;
  a heatable liquid material reservoir defining a heatable inner volume, the heatable liquid material reservoir being disposed within the pressurizable inner volume;
  at least one fluid outlet configured such that the inner opening of said fluid outlet is in fluid communication with the heatable inner volume and the outer opening of said fluid outlet is in fluid communication with the exterior of the pressurizable inner volume;

at least one upper nozzle plate at least partially disposed within the heatable inner volume above the fluid outlet, the upper nozzle plate having at least one tube retaining receptacle disposed therethrough;

at least one gas tube in fluid communication with a gas supply exterior to the pressurizable inner volume and secured within the tube retaining passage such that at least an outlet end of the gas tube is disposed within the fluid outlet such that an annular opening is formed between an outer wall of the gas tube and an inner wall of the fluid outlet, and wherein the upper nozzle plate is movably mounted within the heatable liquid material reservoir such that the radial position of the gas tube relative to the fluid outlet is adjustable; and at least three spacers disposed between the upper nozzle plate and the fluid outlet, and wherein the height of at least two of the spacers are separably adjustable such that the axial and angular position of the gas tube relative to the fluid outlet is adjustable In many other embodiments the apparatus further includes a cooling tube having at least one opening disposed adjacent to the outer opening of the fluid outlet, and being of sufficient height to allow the spheres to cool and solidify therein during transit therethrough, and wherein the cooling tube is configured to be pressurized above or below atmospheric pressure at a pressure independent of the pressure within the pressurizable inner volume.

In still many other embodiments the apparatus further includes at least one feed-through disposed through the wall of the pressurizable vessel, the feed-through being selected from the group consisting of a heating element, a temperature gauge, a gas inlet, a pressure gauge, an electrical feed-through, a viewport, and a liquid or solid material feed-through.

In yet many other embodiments the at least one fluid outlet is disposed in a bottom nozzle plate disposed adjacent to one or both the outer walls of the liquid material reservoir and pressure vessel. In many such embodiments a pressurizable seal is formed between the bottom nozzle plate and one or both the liquid material reservoir and pressure vessel, the pressurizable seal being selected from the group consisting of threaded connections, gaskets, knife edges, and mateable surfaces.

In still yet many other embodiments the upper nozzle plate is secured to at least one of the liquid material reservoir or pressurizable vessel in which it is co-located.

In still yet many other embodiments the pressurizable vessel is configured to be pressurized to at least 200 PSI.

In still yet many other embodiments the heatable inner volume is in hydrostatic balance with the pressurizable inner volume.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIGS. 1b, 1c, 1d and 1e provide schematic bottom and cross-sectional diagrams of the relative alignment of outlets, wherein: 1b) provides a substantially coaxial alignment, 1c) provides a longitudinal alignment adjustment, 1d) provides a radial alignment adjustment, and 1e) provides an angular alignment adjustment, in accordance with embodiments;

(FIG. 6) a crucible, (FIG. 7) a pressure vessel, and (FIG. 8) a cooling vessel in accordance with embodiments;

DETAILED DESCRIPTION OF THE DRAWINGS

Figure 1A:
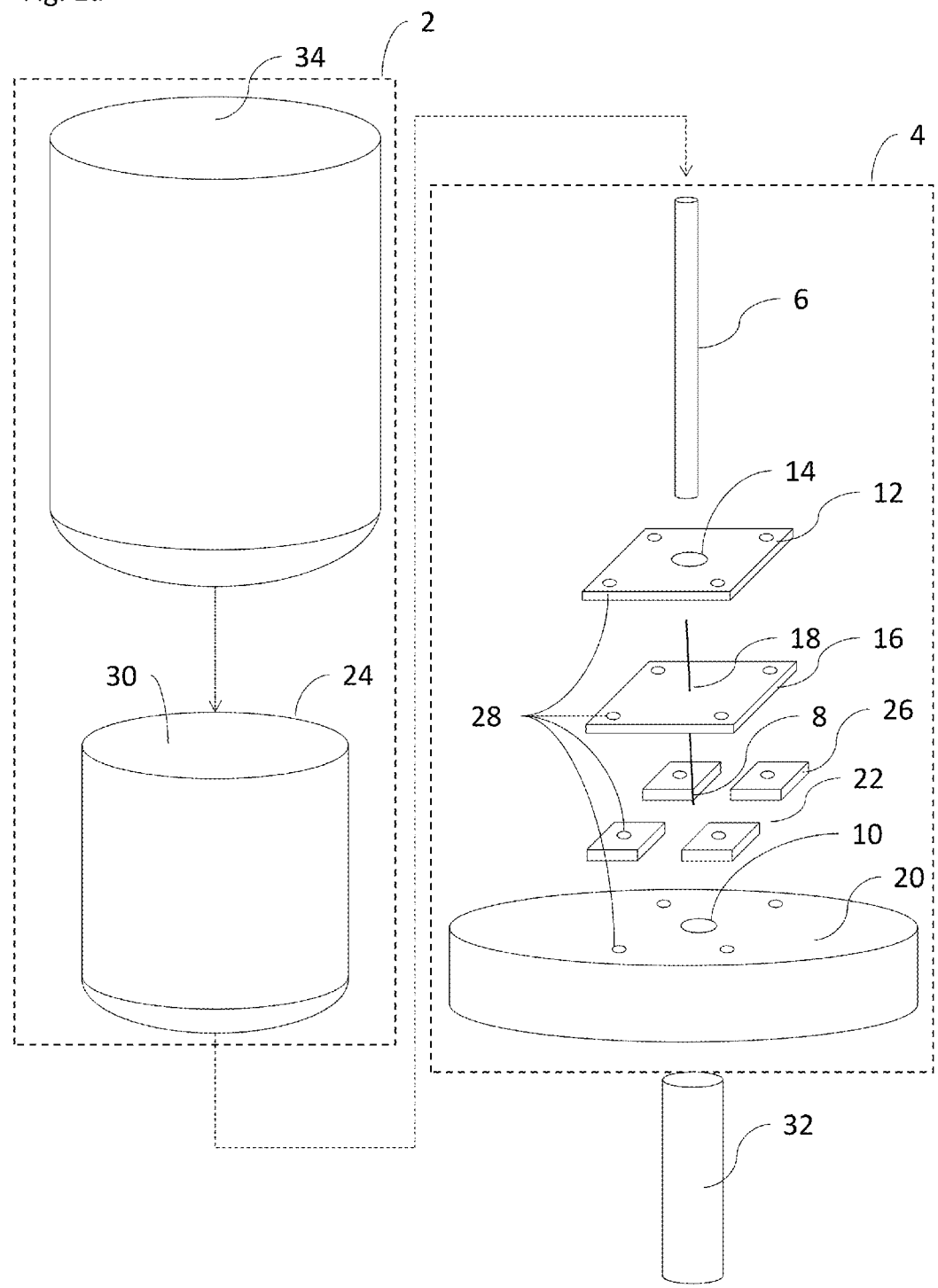
FIG. 1a provides a schematic three dimensional component diagram of a hollow sphere forming apparatus in accordance with embodiments.

The embodiments of the invention described herein are not intended to be exhaustive or to limit the invention to precise forms disclosed. Rather, the embodiments selected for description have been chosen to enable one skilled in the art to practice the invention.

Turning now to the drawings, apparatuses and methods of forming hollow spheres without a driving force such as ultrasonic or air puff formation are provided. In accordance with many embodiments hollow sphere forming apparatus incorporate a bubble forming nozzle assembly in which outlets for a fluid material (e.g., a gas or liquid, it will be understood that throughout the application a gas material may include fluid materials in the liquid state also) and liquid materials are disposed substantially coaxially. (It will be understood that in many embodiments the term "substantially coaxially" will be defined to be configurations having less than about 25% difference between the largest and smallest orthogonal distance between the gas and liquid material outlets.) In many such embodiments the relative positions of the gas and liquid outlets are adjustable in at least one dimension (e.g., axially, radially or angularly relative to each other), such that a more uniform annular exit region for the gas and liquid outlets may be configured, such that more symmetric bubbles may be formed thus reducing the rejection rate in solidified bubbles due to asymmetry or decentering of entrapped gas. In many such embodiments, the nozzle assembly and other components may be formed of materials with sufficient thermal stability and corrosion resistance for the desired liquid, for example Mo, stainless steel, quartz, etc.

In various embodiments the nozzle assembly may be collocated with a heatable crucible such that a solidifiable liquid material may be introduced directly into the annular region formed at the substantially coaxial output of the nozzle assembly thus reducing thermal gradients in the liquid material in the apparatus. In such embodiments the heatable crucible may be adapted to employ any suitable heating mode, such as induction heating, resistive heating, and arc heating. In some embodiments the receptacle of the liquid material may be placed under high pressure such that the pressure drives the fluid into the nozzle assembly and through the annular output of the nozzle assembly. In many such embodiments the high pressure region incorporates a pressure vessel within which may be collocated the heatable crucible such that the flow of the heated liquid material is directly pressure driven. In various such embodiments the passage between the heated crucible and annular output region of the nozzle assembly is comprised of one or more openings through which the pressurized liquid material is driven, thus minimizing the differences in flow rate due to the mass of fluid and column height of the fluid over time under the influence of gravity. In various embodiments, the driving pressure may be varied wherein where the greater a required pressure, the lower the flow rate differences between tall and short columns of fluid.

In many embodiments one or both of the high pressure vessel and/or heatable crucible incorporates an insulation layer and/or cooling media (e.g., water bath, etc.) such that a range of temperatures may be used for melting or processing liquid materials. In many such embodiments a wide-variety of liquid materials may be used with the hollow sphere forming apparatus, including, for example, silicate glass compositions, ceramic compositions, and other high melting temperature materials and materials with high viscosity in the molten state. In many such embodiments a material with a high melting temperature is defined as a material with a melting temperature greater than about 900 C. In many other such embodiments a material with a high viscosity in the molten state is defined as a material with a viscosity greater than about 10 poise.

In many embodiments hollow sphere forming apparatus incorporate one or more cooling tubes disposed in communication with the annular outlet of the nozzle assembly. In many such embodiments the cooling tube is configured to operate under variable pressures, atmospheres, fill gasses, liquids materials, etc. In many such embodiments an interface tube may be provided that provides a transition for bubbles to pass from a hot zone (crucible and/or pressure vessel) into the cooling tube.

The problem of how to reproducibly form uniform hollow spheres has been the subject of research for decades. One technique for producing such spheres is to use concentric nozzles where a gas flows out of an inner nozzle and a liquid material flows through the annular space between the inner nozzle and the outer nozzle wall. Exemplary conventional devices are described, for example in U.S. Pat. Nos. 4,344,787, 4,670,035, 4,960,351, and 4,643,854, the disclosures of which are incorporated herein by reference. Unfortunately, while these devices are suitable for relatively low temperature materials with few material handling challenges, they are inadequate for use with materials that require high temperature or pressure (such as high melting point materials), and or materials with significant handling challenges (such as metallic glasses where cycles of melting and cooling can seriously degrade or entirely alter their material properties. For example, many of these conventional devices (e.g., U.S. Pat. Nos. 4,960,351 and 4,643,854) describe systems in which molten materials are stored in a molten state and delivered to the sphere forming apparatus. However, such a system would be unacceptable for use with materials sensitive to even minor temperature changes (such as metallic glass). Other of these conventional devices (e.g., U.S. Pat. Nos. 4,344,787 and 4,670,035) provide systems in which reservoirs of liquid material are collocated with the outlet of the gas material, however, these liquid material reservoirs are each configured to be sealed from the gas source such that where high gas pressures are required (e.g., in the case of high viscosity liquid materials), the liquid material reservoir would be exposed to a very high pressure differential requiring much more robust liquid material reservoir bodies and increasing the likelihood of failure of components exposed to the high pressure differentials.

More specifically, many hollow sphere forming apparatuses have been disclosed claiming to be able to form hollow spheres at elevated temperatures and/or high pressures. (See, U.S. Pat. Nos. 4,671,909 and 4,670,035). Typically, these inventions are limited to using low viscosity materials at high temperatures (requiring lower pressures to expel the liquid through a given annular region) or high viscosity materials at low temperatures (allowing the liquid vessel to maintain sufficient strength for the required pressures). Most materials exhibit degradation in material properties (e.g. increased creep rate, decreased mechanical strength, etc.) with increased temperature, Marks' Standard Handbook for Mechanical Engineers $9^{th}$ edition Avallone, and Baumeister, McGraw-Hill 1969 which is incorporated herein by reference. For example, steel loses as much as 80% of their resistance to rupture at temperatures above 600 C. In the simplest case, a thin walled spherical pressure vessel experiences stresses equal to:

$$\sigma = \frac{pr}{2t} \qquad \text{(EQ. 1)}$$

where σ is the stress experienced by the material of the pressure vessel, p is the internal pressure, r is the radius of the vessel, and t is the wall thickness. This failure relationship requires pressure vessels to be small volume, low pressure, or maximum thickness to achieve optimal strength. None of these tradeoffs are desirable for a hollow sphere forming apparatus.

Finally, one of the chief design challenges in sphere-forming apparatus is the configuration of the annular outlet where the spheres are formed. Even a relatively minor misalignment between the gas nozzle and the wall of the liquid material outlet can lead to inconsistent or defective sphere formation. Conventional designs do not provide for systems that allow correction of misalignment along multiple degrees of freedom.

Accordingly, many embodiments are directed to hollow-sphere forming apparatus and methods that do not require a driving force (e.g., ultrasonic or air puff) that allow for the use of any materials under any desired conditions by collocating the elements of the apparatus including liquid material reservoir (and heated crucible if necessary) within a pressure vessel in a hydrostatic arrangement. Specifically, many embodiments cool the vessel required to maintain high pressure thus maintaining mechanical strength of the pressure vessel and encloses and isolates the high temperature region (crucible or liquid material vessel) inside the pressure vessel with layers of insulation to allow high melting temperature materials to be formed into hollow spheres. The benefit of isolating the crucible inside the pressure vessel is that the inner and outer walls of the crucible are mainly subjected to hydrostatic stress during the time they are weakened by the high temperatures required to melt the material and thus not likely to rupture with the pressure required to push viscous material through the liquid nozzle exit. If this isolation is not incorporated into the design of the apparatus, the high temperature region is subjected to axial, radial, and circumferential stresses. Accordingly, in many embodiments the only region of the crucible not under hydrostatic stresses is the lower nozzle plate which can be made thick enough to withstand the expected pressures. The separation of the pressure containing function and high temperature function into two vessels also allows flexibility in design. Steels or other high strength materials can be used for the pressure vessel and maintained at a temperature where they have maximum strength and graphite or molybdenum or tungsten which are much lower strength materials but exhibit excellent temperature resistance can be used for the crucible material in a region where high strength is not required.

Embodiments also provide a modular nozzle assembly wherein the relative position of the gas and liquid material outlets may be controllably adjusted in any dimension (e.g., radial, axial and angular), and where the fluid conduit volume for delivery of the liquid material to the outlet can also be adjusted.

FIG. 1a shows a disassembled schematic view of a hollow sphere forming apparatus in accordance with various embodiments. As shown, in many embodiments hollow sphere forming apparatus include a nozzle assembly (4), and a liquid material reservoir (2). The nozzle assembly (4), according to many embodiments comprise of at least a gas inlet (6) a gas outlet (8), and a liquid material outlet (10) configured such that the gas outlet can be disposed coaxially therewith and therein such that a gas passing through said gas outlet will be deposited within the flowing liquid material.

As shown in FIG. 1a, in many embodiments the gas inlet and outlet are formed of separate hollow tubes that are interconnected within the nozzle assembly in a plurality of nozzle plates (12 and 16). Specifically, in the embodiment shown in FIG. 1a, the nozzle assembly is formed of three plates: an upper nozzle plate (12) having a mounting port disposed therein (14) in which the outlet of the gas inlet (6) is mounted (e.g., via a threaded connection or the like), a middle nozzle plate (16) disposed adjacent the upper nozzle plate and having a mounting port (18) in which the inlet of the gas outlet (8) is mounted (e.g., via a press fit or other means), and a lower nozzle plate (20) in which the distal end of the gas outlet (8) and the liquid material outlet (10) are disposed. This arrangement of the gas inlet tube into the upper nozzle plate and separate mounting of the gas outlet tube allows for the gas inlet to be disposed around the gas outlet without needing to machine the gas feed as a single assembly thus allowing for a more flexible alignment of the relative components to each other. Note, where threading interconnections are used, various threading configurations can be used including but not limited to National Pipe Thread Taper (NPT), SAE, coarse and fine threads. A liquid material inlet (22) providing fluid communication from the liquid material reservoir (24) to the outlet (10) disposed in the lower nozzle plate (20) is provided within or below the upper and middle nozzle plates. In many embodiments, as shown in FIG. 1a the liquid material inlet may be formed of one or more spacers (e.g., washers or the like)(26) that provide an opening beneath the middle and lower nozzle plates such that a fluid path is formed between the liquid material reservoir and the liquid material outlet.

The elements of the nozzle assembly may be mounted in relation to each other in any manner that allows for the adjustment of the position of the gas outlet relative to the liquid material outlet. In many embodiments the nozzle assembly plates may be mounted relative to each other via connectors (e.g., bolts or the other connectors, 28) machined to allow for minor independent adjustment of components, such as the gas outlet tube, which is mounted within the middle nozzle plate, to be centered in the liquid material outlet in the lower nozzle plate. Although one configuration of nozzle assembly elements is shown in FIG. 1a, it should be understood that various elements of the nozzle assembly may take many different configurations. For example, the gas outlet tube (8) may be extended through the liquid material reservoir such that it engages the gas inlet tube outside of any crucible or high pressure vessel. In addition, although separate upper and middle plates are shown into which the gas inlets and outlet are disposed, it should be understood that these plates maybe combined into a single mounting plate into which one or both of the gas inlet and/or outlet are disposed. In particular, although specific arrangement of plates and inlets and outlets are shown, it should be understood that this configuration may take any form such that separate gas inlet and outlet tubes are provided, and such that the position of the gas outlet relative to the liquid material outlet may be adjusted in at least one dimension, e.g., radial, axial and and/or angular. (Schematics of these degrees of dimensional alignment freedom are provided in FIGS. 1b, 1c, 1d and 1e for illustrative purposes, where the gas outlet (8) is shown superimposed over the liquid material outlet (10) relative to the axis of the liquid material outlet (36).)

The nozzle assembly (4) is in fluid communication with a liquid material reservoir (24). In many embodiments the nozzle assembly is at least partially contained within the liquid material reservoir. The reservoir may incorporate or comprise a crucible (not shown in FIG. 1a) if heating of material is required or if a solid material is to be melted or taken above a glass transition temperature. Optionally, the reservoir (24)(including crucible) and nozzle assembly (4) may further incorporate or comprise a pressure vessel (e.g., having pressurized gas inlet, not shown in FIG. 1a). In embodiments comprising a pressure vessel, the liquid material reservoir (24) has an opening (30) disposed along the body thereof such that the liquid material is retained within the liquid material reservoir, but that the internal volume of the liquid material reservoir is exposed to the pressure within the pressure vessel such that the liquid material reservoir is in hydrostatic balance with the pressure vessel when the pressure vessel is pressurized, liquid material may be forced through the liquid material inlet (e.g., between spacers (26) and through liquid material outlet (10) in the lower nozzle plate (20)).

In accordance with embodiments, the pressure vessel may be made of a material with sufficient strength (e.g., material strength, material thickness, etc.) to contain the pressure required to extrude the liquid material through the annular region of the nozzle outlet and overcome the pressure in the cooling tube (32) if pressurized hollow spheres are desired. Typically, high viscosity liquids and smaller annular regions will require more pressure to achieve a desired flow rate than less viscous liquids and larger annular regions, as will be understood by those in the art. This phenomenon is described for the idealized case of an incompressible and Newtonian fluid in laminar flow flowing through a long cylindrical pipe of constant cross section by the Hagen-Poiseuille equation:

$$\Delta P = \frac{8\mu L Q}{\pi r^4} \quad \text{(EQ. 2)}$$

where ΔP is the pressure required to move a viscous liquid through a pipe with the following properties and rate, L is the length of the pipe, Q is the volumetric flow rate, μ is the dynamic viscosity and r is the radius of the pipe.

In accordance with embodiments, the pressure vessel may be made from materials such as propane tanks or compressed air cylinders such as scuba tanks. In many embodiments commercially available pressure vessels may be used or modified (e.g., via cutting and welding on flanges to allow insertion of nozzle assembly and crucible and resealing the pressure vessel). Various methods of sealing the pressure vessel or any of the other components of the apparatus and containing the pressure (or in embodiments including a cooling vessel excluding the cooling medium, etc.) may be used including knife edges, gaskets (such as O-ring gaskets), or machined flat surfaces etc. O-rings or gaskets can be used for sealing the different components. In some embodiments, this sealing can be especially important between pressure vessel and pressure vessel sealing plate. In such embodiments, bolts or other fasteners may be used to hold the sealing surfaces together under pressure. Weld joints can also be used to connect tubes or pipes and plates to form the various vessels and tubes. In yet other embodiments, electric feedthroughs and pressure and gauge feedthroughs into the pressure vessel may be included as required. In still other embodiments, insulation may be provided between the crucible (if appropriate) and the wall of the pressure vessel. Exemplary insulation materials include, for example, reflective foil, or an open cell insulation material with high thermal stability such as SALI-2 (a silica alumina composition), etc. Note that the insulation material in many embodiments is open cell because closed cell material under hydrostatic stresses may experience compressive stresses sufficient to collapse the closed cells at the pressures required to push viscous material through the annular region to form hollow spheres, while open cell material will only experience hydrostatic stresses on all sides of the open walls of the cellular material and thus be less likely to reach the failure stress of the material.

An optional cooling vessel (34) is also shown, and may be incorporated in some embodiments. Having a cooling vessel allows the liquid material reservoir (including, where relevant, crucible and pressure vessel) (24) to be submerged in a bath of cooling medium (e.g., water) to keep the material that the liquid material reservoir is made of at a safe temperature regardless of what temperature to which the optional crucible may be heated. Although one cooling medium (e.g. water) is described above, it should be understood that alternate cooling media including but not limited to oil, molten salts, liquid nitrogen, liquid argon, other cryogenic fluids, may be used.

Finally, an optional cooling tube (32) may be provided at the outlet to the nozzle assembly to allow the bubbles formed at the outlet of the nozzle to solidify in a controlled environment, e.g., pressure, temperature, atmosphere, etc.

Figure 2:
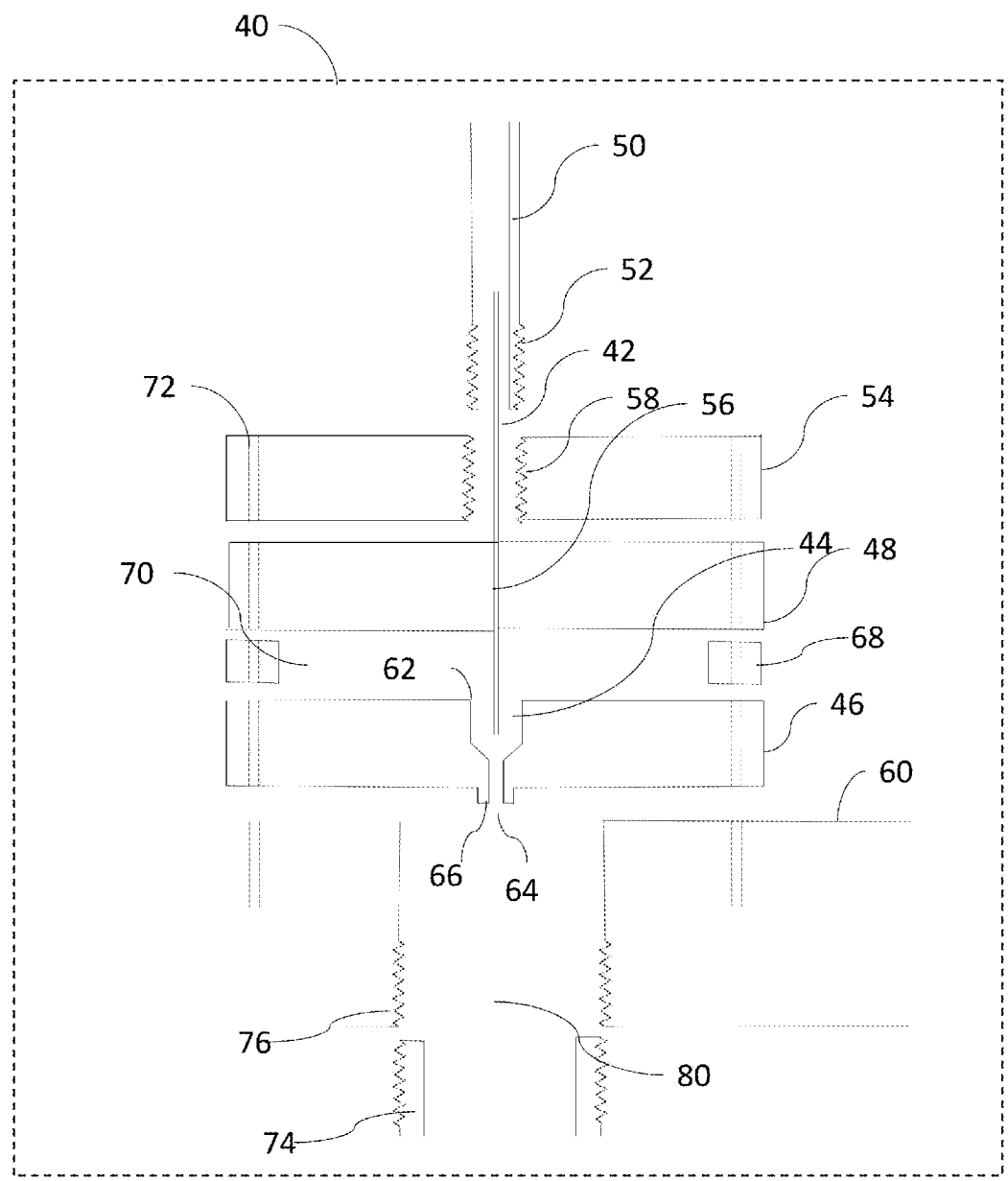
FIG. 2 provides a schematic cross-section diagram of a nozzle assembly in accordance with embodiments.

FIG. 2 provides a schematic cross-section of a nozzle assembly (40) in accordance with various embodiments. The exemplary nozzle assembly of FIG. 2 is configured to be modular allowing more simple fabrication of the components and alignment of the gas outlet tube (which may be in the form of a needle) (42) with a liquid material outlet (44) in the lower nozzle plate (46). In many embodiments the nozzle assembly provides a mount (e.g., middle plate, 48) for affixing the gas outlet tube (42). In various embodiments the gas outlet tube may be a needle or other fluid conduit (42) press fitted or otherwise affixed within an adjustable fixation plate, such as a middle nozzle assembly plate (48). The gas outlet tube is configured to provide a fluid connection between a nozzle assembly outlet (44) and a gas inlet tube (50). The gas inlet tube in turn provides a fluid connection between a gas reservoir and the gas outlet tube. The gas inlet tube is configured to be affixed such that the outlet of the inlet tube is in fluid communication with the inlet of the outlet tube. In many embodiments, as shown in FIG. 2, this may be accomplished by affixing the outlet of the inlet tube (52) within an upper nozzle assembly plate (54) disposed adjacent the middle nozzle assembly plate (48). The male threads shown on the outlet of the inlet tube (52) which are screwed into the female threads of the upper nozzle assembly plate (54) may be non-gas tight. When highly viscous fluids are used, little gas escapes into the liquid in the liquid material reservoir. Although in the embodiment shown in FIG. 2 the inlet tube and outlet tubes are disposed within fixation points (e.g., press fit opening (56) and threaded receptacle (58)) within two separate plates, it should be understood that these fixation points could be combined in a single plate. For example, the upper and middle nozzle assembly plates may be combined into a single plate where an upper region of the single plate can be provided with a receptacle (e.g., threading) to receive an inlet gas tube and an outlet gas tube can be disposed (e.g., via press fitting, threading) into a lower part of the nozzle assembly plate. Alternatively, the outlet tube (42) may extend out of the nozzle assembly and interconnect with the inlet tube outside that assembly.

The lower nozzle plate (46) is disposed between the middle nozzle assembly plate (e.g., the mount for the gas outlet tube) and the wall of the liquid material reservoir (60). As shown, the lower nozzle plate comprises a liquid material outlet (44) into which the outlet of the gas outlet tube (56) may be positioned (e.g., coaxially within). Although, in FIG. 2, the liquid material outlet has a configuration that tapers from its inlet (62) to its outlet (64), it should be understood that any liquid material outlet suitable to produce a desired flow of liquid material to the outlet of the liquid material outlet may be provided, including, for example, straight-sided, tapered, corrugated, etc. In many embodiments, the outlet of the liquid material outlet includes an annular lip (66) formed around the circumference of the outlet. In various embodiments such an annular lip assists in the formation of a meniscus from the liquid material which is then used to form bubbles by injecting the gas therein. It should be understood that the dimension, both circumference and height, may be varied to improve the formation of a meniscus for liquid materials of different viscosities (e.g., in some embodiments more viscous liquids require larger raised areas than less viscous liquids). Additionally, it should be noted that the annular lip (66) may not have a rectangular cross section but could be tapered or rounded on the outside or inside edge. For liquids with a viscosity in the 10-50 poise viscosity range, it is found that a liquid outlet inner diameter of 0.063" with an annular lip 0.070" tall and outer diameter between 0.09" and 0.15" is exemplary for hollow sphere formation.

In many embodiments, as also shown in FIG. 2, to provide fluid access to the liquid material outlet from the liquid material reservoir (60), spacers (68) are provided adjacent the lower nozzle assembly plate (46) to provide a gap between the lower assembly plate and the adjacent plate (e.g., in 70, the middle nozzle assembly plate) through which the liquid material can flow into the annular opening formed between the inner wall of the liquid material outlet (44) and the coaxially oriented gas outlet tube (42). Although a set of equally sized spacers are shown in FIG. 2, it should be understood that any number and size of spacers may be provided that allow for the fluid communication of the liquid material into the liquid material outlet. For example, in many embodiments the height of the spacer may be adjusted to alter the longitudinal position of the gas outlet tube to the lower nozzle assembly plate. Alternatively, spacers of different height could be used to adjust the relative angle between the gas outlet tube and the liquid material outlet. Such adjustability allows for the optimization of the relative positioning of the outlet of the gas outlet tube and the outlet of the liquid material outlet thereby allowing for the formation of an optimized annular region where the gas from the gas outlet tube and the liquid material from the liquid material outlet mix to form the hollow spheres.

Thru holes (72) in an upper nozzle plate (54), middle nozzle plate (48), spacers (68), allow the position of the nozzle plates and spacers to be adjusted relative to the outlet gas tube (42). An ability to adjust relative position of these components allows for centering the outlet gas tube in the liquid material outlet thus forming a more perfect or suitable annular region for liquid to flow through and lowering required machining tolerances thus increasing machinability/reducing cost. Additionally, although single nozzles are shown in FIGS. 1a and 2, multiple liquid material outlets and outlet gas tubes can be machined into a nozzle assembly producing additional bubble forming capacity for a given nozzle assembly. The height of spacers (68) can be adjusted to change a distance of the outlet gas tube from the liquid material outlet. Different height spacers can be used in various positions between the nozzle assembly plates to correct for axial misalignment if the outlet gas tube is not normal to the liquid material outlet. Alternatively, the spacers maybe formed of adjustable supports, such as threaded rods such that the height of the spacers can be continuously and finely adjusted. Regardless of the specific design of the adjustable spacers, in many embodiments the various plates of the nozzle assembly may be supported by at least three independently adjustable spacers such that the angle of the plane of the various plates relative to the other plates may also be adjusted.

As shown in FIG. 2, in many embodiments a cooling tube (74) is disposed at the outlet to the nozzle assembly (76). The cooling tube, in which the formed bubbles solidify, is not a necessary component of the design and can be omitted if circumstances warrant. Where a cooling tube is provided, it may be formed integrally with the nozzle assembly, or be detachably affixed, such as through a threaded connector (as shown in FIG. 2) or equivalent interconnection. In embodiments using threaded connections, various threading configurations can be used including but not limited to NPT, SAE, coarse and fine threads.

In many embodiments, the cooling tube may be provided where the liquid material from which bubbles are to be formed has sensitivity to oxidation or if the bubbles need to be pressurized above (or below) atmospheric pressure, or if an additional driving force to remove heat is required. In some embodiments, the cooling tube is filled with an inert gas to limit oxidation. Such gasses may include but are not limited to argon, krypton, xenon, etc. In other embodiments, the cooling tube could be filled with a reactive gas to form nitrides or oxides or other reactive surface features. In various embodiments, the cooling tube could incorporate a pool of liquid cooling medium at the outlet thereto and into which the bubbles could be deposited after formation. Suitable cooling media in accordance with embodiments may include but are not limited to water, ice water, liquid nitrogen, liquid argon, liquid oxygen or other cryogenic liquids. The cooling tube height can vary depending on the distance required for solidification of the bubbles. In many embodiments the cooling tube can be configured with a temperature gradient from top to bottom to more carefully control the cooling rate of the bubbles. In many embodiments feed-throughs or other elements may be incorporated into the cooling tube. For example, gas, vacuum or electrical feed-throughs may be provided as necessary to allow for the adjustment of the temperature, atmosphere or pressure in the cooling tube. In other embodiments, the cooling tower may contain viewports and pressure ports and ports for gauges and removable caps to allow removal of formed bubbles. Likewise, any number and/or configuration of valves may be provided.

In many embodiments additional feed-throughs which may also be threaded or welded or press fit into the various chambers (e.g., pressure vessel, cooling vessel, crucible, liquid material reservoir, etc.) may be provided for heating, temperature control, pressure control, temperature and pressure monitoring, visual aids such as sight glasses or view ports, induction heating feed-throughs, thermocouple feed-throughs, and feed-throughs for the addition of fluid or solid material into an appropriate vessel (e.g., crucible, liquid material reservoir, cooling vessel, etc.) may also be included. Many types of fittings are suitable for containing pressure and elevated temperatures including but not limited to compression fittings, kwik flange, knife edge. Methods to seal fittings include but are not limited to Teflon tape, various liquid sealants, carburized versions of sealants, gaskets and o-rings. O-rings and gaskets can be made of many types of material including but not limited to viton and rubber and silicone. O-rings and gaskets can be omitted and replaced with knife edges and copper gaskets as is common in many vacuum and pressure systems. Surface ground surfaces can be mated to achieve an acceptable seal as well. For applications where high pressure and temperature are not required or for the cooling vessel, polymer and plastic components are acceptable.

It should be understood that the components of the nozzle assembly may be formed from any material suitable for processing materials with the required melting temperatures. For example, for high melting temperatures (e.g., >900 C and in many embodiments >1600 C), any material with suitable thermal stability for the desired liquid can be used with some embodiments of this disclosure or the invention, such as, for example, tungsten, molybdenum, tantalum, rhodium, platinum, and alloys and carbides and oxides of such materials. For moderate temperature melting materials (>100 C), many more options exist for the materials exposed to elevated temperatures. Exemplary materials include but are not limited to Steel alloys, Brass, Copper, Titanium, Hastelloy, Inconel, other super alloys and alloys of the listed materials. Composite materials may also be acceptable for many components of the invention.

Figure 3:
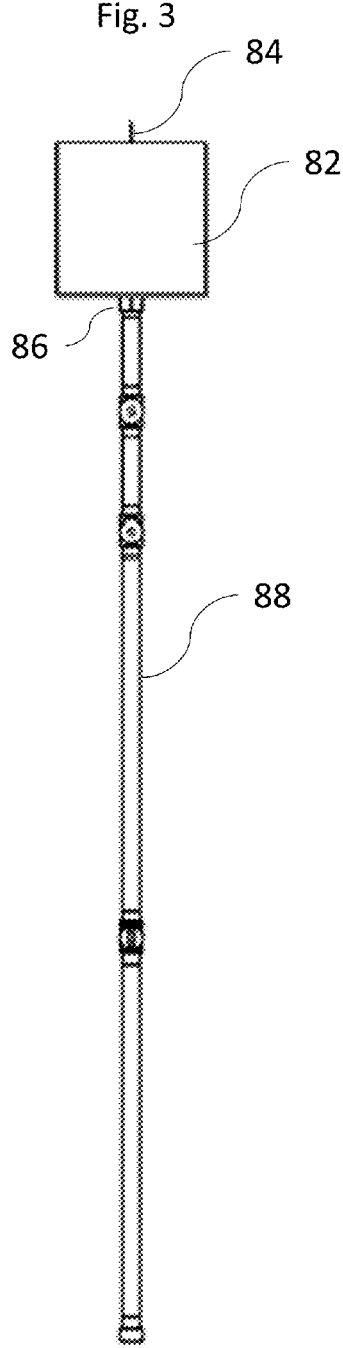
FIGS. 3, 4 and 5 provide schematic front and side view diagrams of a hollow sphere forming apparatus in accordance with embodiments.
Figure 4:
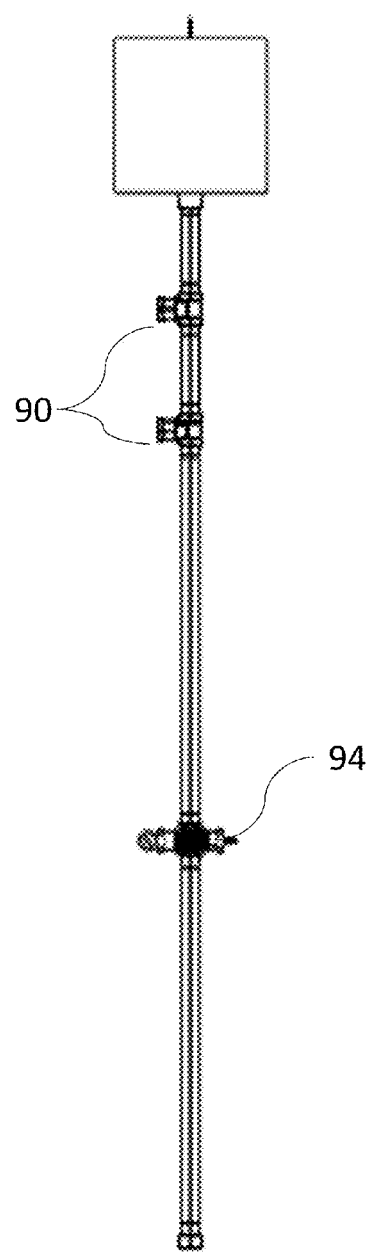
Figure 5:
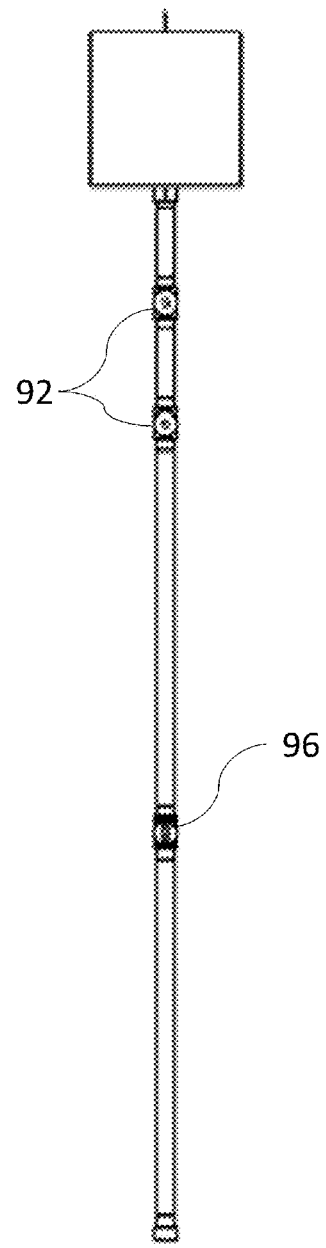

As will be understood, the basic elements of the hollow sphere forming apparatus may be configured into a variety of embodiments. Schematic diagrams of an exemplary embodiment of a hollow sphere forming apparatus are provided in FIGS. 3, 4 and 5. FIGS. 3, 4 and 5 provide front and side external views, and show that the hollow sphere forming apparatus generally comprises a nozzle assembly enclosure (82) (which can be filled with a fluid for cooling the pressure vessel) having at least one gas inlet (84) and at least one sphere outlet (86). This embodiment also incorporates a cooling tube (88) interconnected with the sphere outlet. As further shown, the cooling tube may include one or more feed-throughs/ports (90 & 92) and/or valves (94 & 96). Although specific arrangements of elements are shown in FIGS. 4 and 5, it should be understood that any number of feed-throughs, ports and valves may be included in such a cooling tube to suit the application, as described above. Cooling tubes may also be pressurized and have viewing ports or measuring ports or be filled with inert gas or evacuated to vacuum pressures depending on the bubble forming requirements. Under vacuum conditions, a large bubble expansion can be expected and thus this approach could be a means for producing thinner bubble walls or larger bubble diameters.

Figure 6:
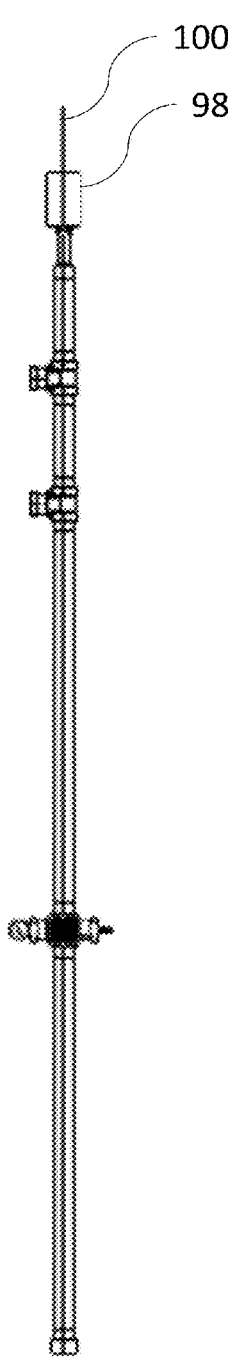
FIGS. 6, 7, and 8 provide schematic side view diagrams of a hollow sphere forming apparatus including.
Figure 7:
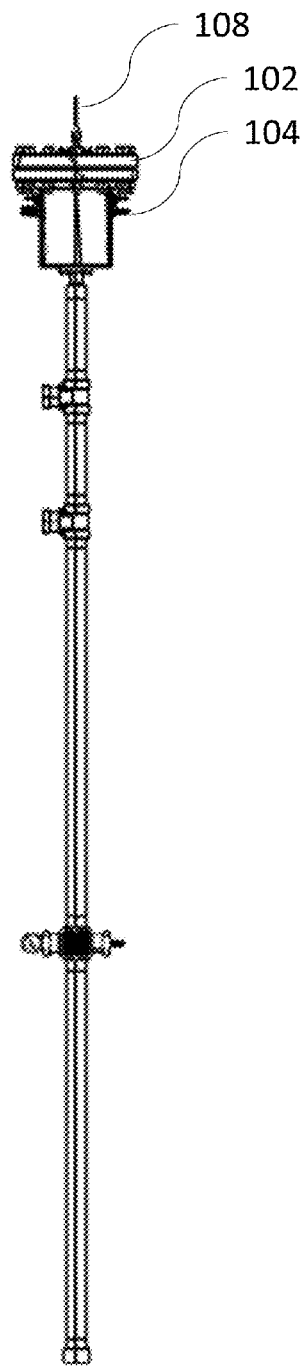
Figure 8:
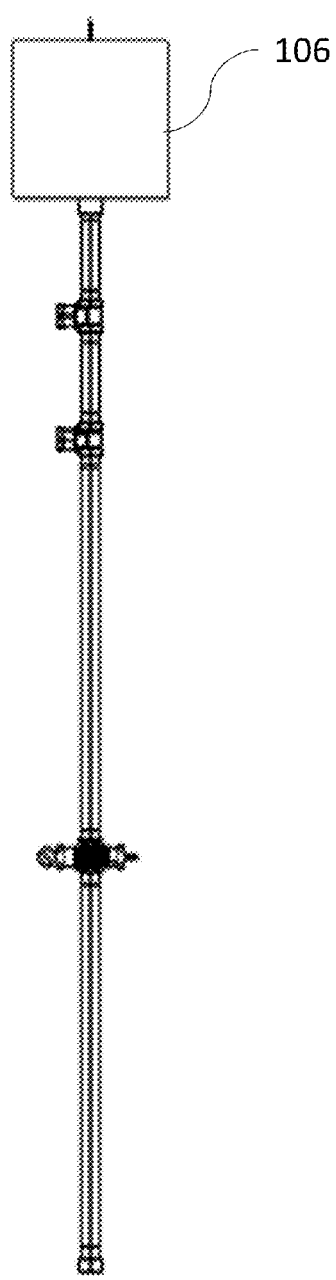

Turning to the construction of the nozzle assembly and enclosure, FIGS. 6 to 7 provide side view schematics showing the nested elements that comprise such nozzle assembly and enclosure. As shown in FIG. 6, in many embodiments the nozzle assembly comprises a liquid material reservoir (98), which may or may not incorporate or comprise a heated crucible, into which the gas inlet (100) is disposed. In many embodiments this liquid material reservoir may be disposed within a pressure vessel (102). As described above, and shown, such a pressure vessel may include any number and configuration of viewports, ports, feed-throughs, etc. (104). As shown in FIG. 8, in turn, in various embodiments, the liquid material reservoir, either alone or in combination with the pressure vessel, may be disposed within an insulation or cooling vessel (106). Specifically, use of a single feed-through (108) for high and low pressure gas is not desirable for applications where high temperatures in a crucible are required. In such high temperature embodiments, each feed-through may be placed into thermal contact with a cooling bath rather than using nested feed-throughs in order to provide external cooling for components mating with the pressure vessel which may have lower thermal stability than the crucible and nozzle assembly components. Multiple feed-throughs (104) may also be required to introduce wires for heating elements or thermocouples. RF feed-throughs for induction heating the crucible are also envisioned for some applications.

Figure 9:
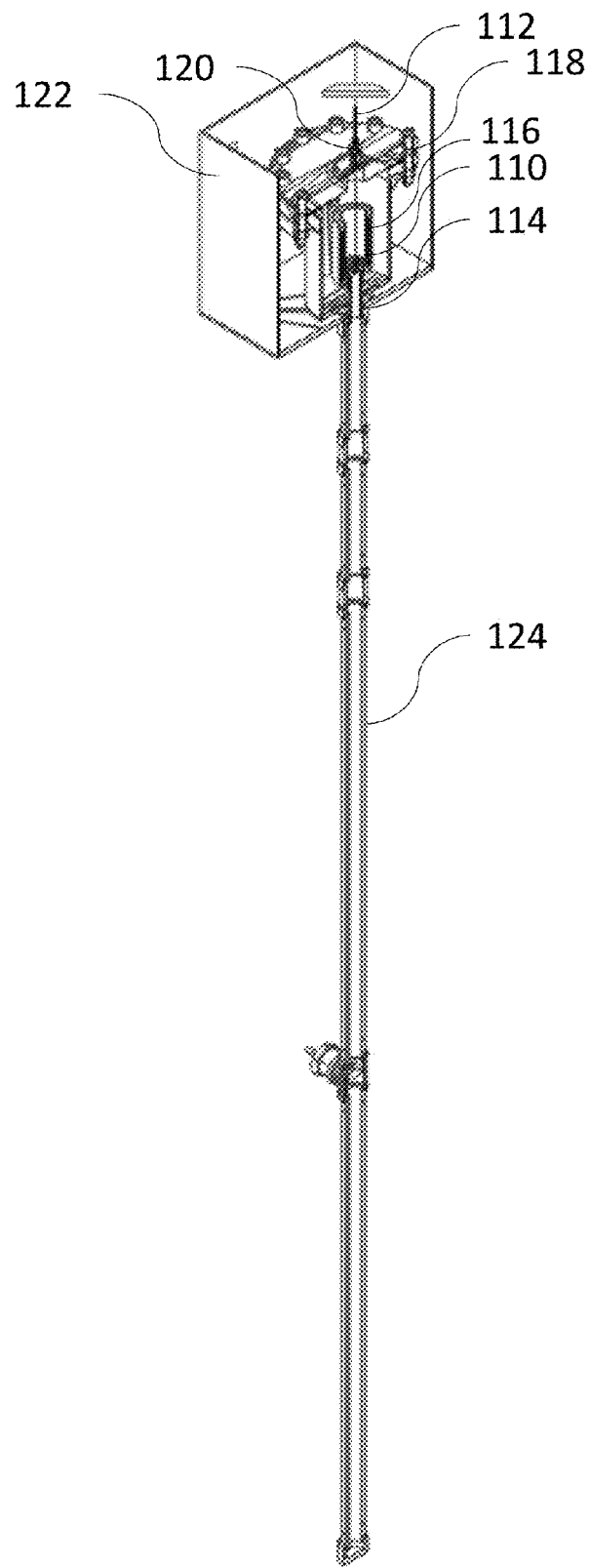
FIG. 9 provides a schematic cross-section diagram of a hollow sphere forming apparatus in accordance with embodiments.

A cross-sectional view of the hollow sphere forming apparatus in accordance with embodiments is shown in FIG. 9. As seen, in many embodiments the liquid material reservoir (110) is disposed in fluid communication between the gas inlet (112) and the nozzle assembly outlet (114). The liquid material reservoir may (as shown) comprise a crucible having heating element (116) disposed in heating relation thereto. The liquid material reservoir (and optional crucible) may be disposed within a pressure vessel (118) into which the gas inlet passes via one or more feed-throughs (120). This pressure vessel may, in turn, be disposed within an insulation and/or cooling vessel (122). Although not shown, insulation may be required to protect the pressure vessel (118) from the high temperatures reached in the crucible (110). Such insulation can take any suitable form. For example, in many embodiments insulation may be formed from elements configured to fill the space between the edge of the crucible and pressure vessel (e.g., for a cylindrical design the insulation may be formed as rings), or alternatively insulation in pieces (e.g., semi-circular cylindrical) may provide spaces for feed-through components and maximize yield of insulation material. Additionally, seams of insulation pieces in the stack surrounding the crucible may be rotated to minimize hot zones developing in pressure vessel inner wall. An additional sleeve of high temperature resistant material may also be placed around the nozzle assembly or crucible (110) which could be used to improve uniformity of heat or minimize heat losses to insulation material. In addition, the exemplary cooling vessel (122) can have optional leveling spacers (not shown) for the pressure vessel (118) to lessen the torque experienced by the interface tube (114) and, where present, elongated cooling tube (124).

Figure 10:
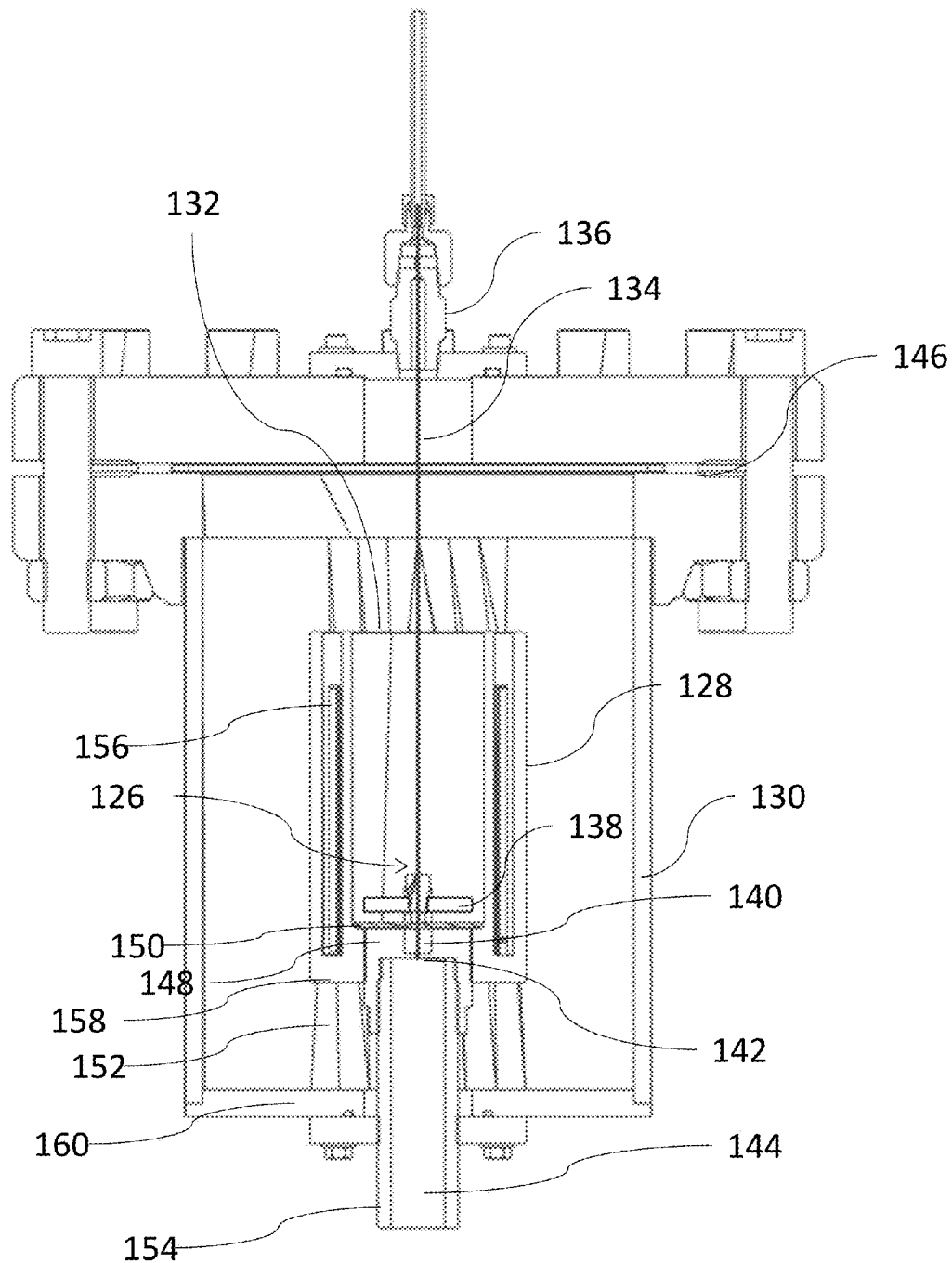
FIG. 10 provides a schematic cross-section diagram of a hollow sphere forming apparatus, including high pressure vessel in accordance with embodiments.

FIG. 10 shows a close up cross-section of an exemplary hollow sphere forming apparatus comprising a nozzle assembly (126) disposed within a liquid material reservoir/crucible (128) disposed within a pressure vessel (130), and having an opening (132) into the pressure vessel such that the interior of the liquid material reservoir/crucible is in hydrostatic balance with the pressure vessel. In this embodiment a unitary gas tube (134) provides a fluid passage through a feed-through (136) disposed in the outer-wall of the pressure vessel through the liquid material reservoir (128) and through a nozzle assembly plate (138) and into the liquid material outlet (140) such that gas exits into the annular outlet (142) at the exit of the nozzle assembly to be dispersed within the liquid material also exiting the annular exit to form hollow spheres within an exit region (144).

Figure 11:
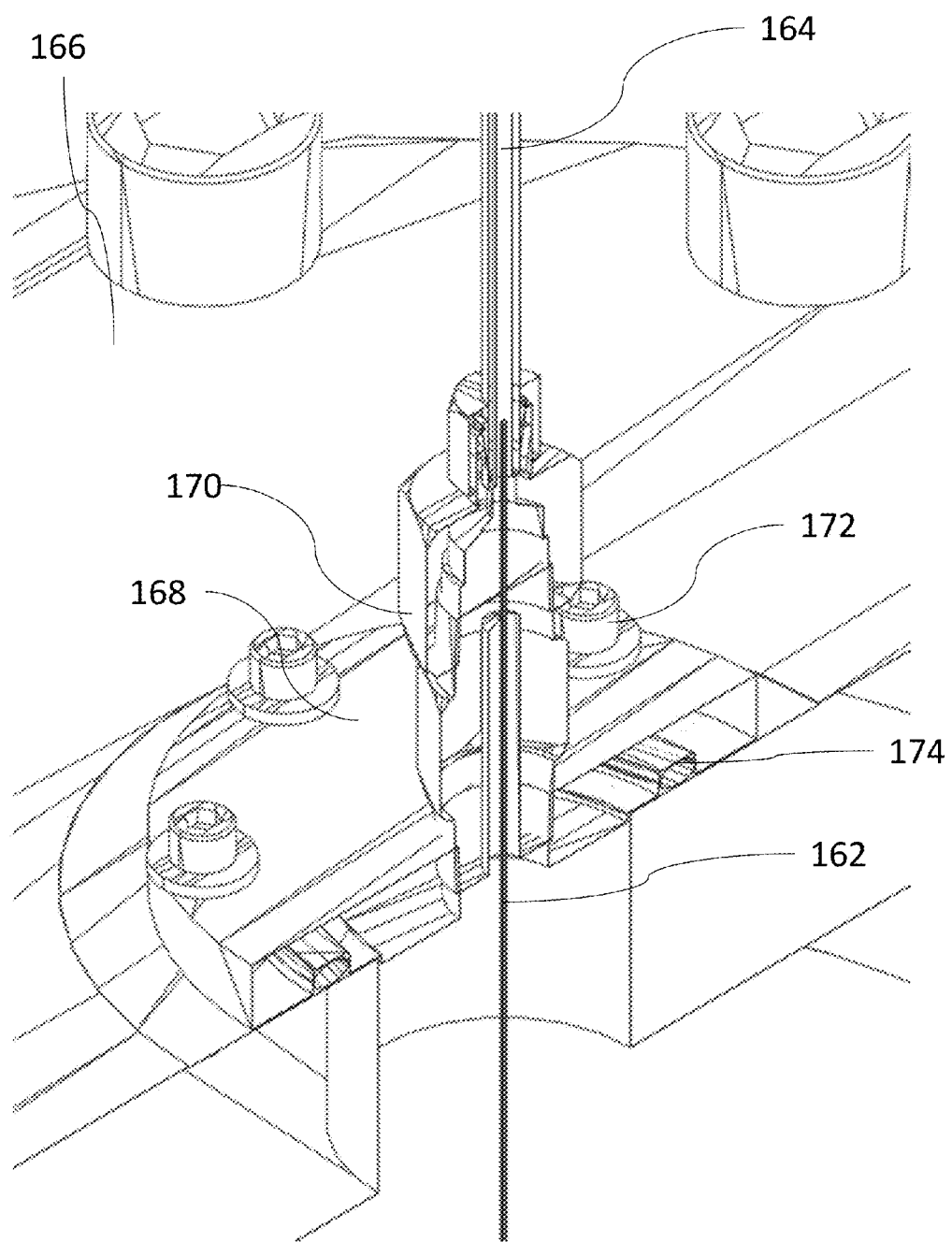
FIG. 11 provides a detailed schematic cross-section diagram of a top portion of a pressure vessel in accordance with embodiments.

As shown in greater detail in FIG. 11, in this alternative embodiment the gas tube (162) is not bifurcated within the liquid material reservoir. Instead, the gas tube is interconnected with a gas supply tube (164) external to the pressure vessel (166). Although as shown in this embodiment, a feed-through (168) having a compression fitting tube interconnection (170) may be utilized, it will be understood that any suitable feed-through and fitting configuration capable of fluidly interconnecting the gas supply tube (164) and the gas tube (162) may be used in embodiments. Exemplary interconnections may include, for example, threaded interconnections or press fit interconnections. Further, as shown in FIG. 11, in some embodiments the gas feed-through (168) may be interconnected with the pressure vessel via a bolted interconnection (172) that is sealed via a gasket (174). Alternatively, the feed through can be welded or integrally formed into the pressure vessel, or a knife edge can be machined into the feed-through which would cut into the high pressure vessel, or a flat surface may be machined into the surfaces engaged between the feed-through and pressure vessel to achieve a better seal. Similar interconnections and seals can be formed into a pressure vessel lid (146) and into the lower nozzle assembly plate (148) to seal upper and lower openings in the pressure vessel. In particular, in some embodiments it is important to carefully machine a bottom of crucible (150) and the lower nozzle plate (148) to achieve as tight a seal as possible between these components. This seal may be achieved in many ways including but not limited to press fitting the components or by threading them together. Alternatively, a knife edge can be machined into the lower nozzle plate (which will cut into the crucible), or an optional gasket (not shown) to achieve a better seal. In many embodiments, the crucible may rest on a layer of insulation (152) and have an optional interface tube (154) to allow bubbles to pass from the nozzle assembly into the exit region (144) and then into a cooling tube (not shown). Heating elements may be placed within the wall of the crucible (156). Placement of the heating elements in this manner can protect the heating elements from mechanical damage as well as ensure maximum heat is transferred to the material to be melted in the crucible. In addition to the insulation layer below the crucible, it may be desirable to place solid mechanical supports at multiple locations between the bottom of the crucible (158) and pressure vessel bottom (160), the height of such supports can in some embodiments be adjusted to vary the longitudinal and angular positions of the liquid reservoir/crucible and high pressure vessel relative to each other and the gas tube. It is illustrative to compare the mating of the lower nozzle plate (46) and the liquid material reservoir (60) in FIG. 2 to the mating of the lower nozzle plate (148) and the liquid material reservoir (128) in FIG. 10. In FIG. 2, the mating surfaces are pressed together via a compressive force such as two surfaces being bolted together. In the event that liquid leaks through the mating surfaces in FIG. 2, it enters the region where bubble formation is occurring (80). In FIG. 10, the mating surfaces are press fit or screwed into each other. Accordingly, in the event that liquid leaks through the mating surfaces in such embodiments, it enters the pressure vessel (130) but does not interfere with bubble formation.

Figure 12:
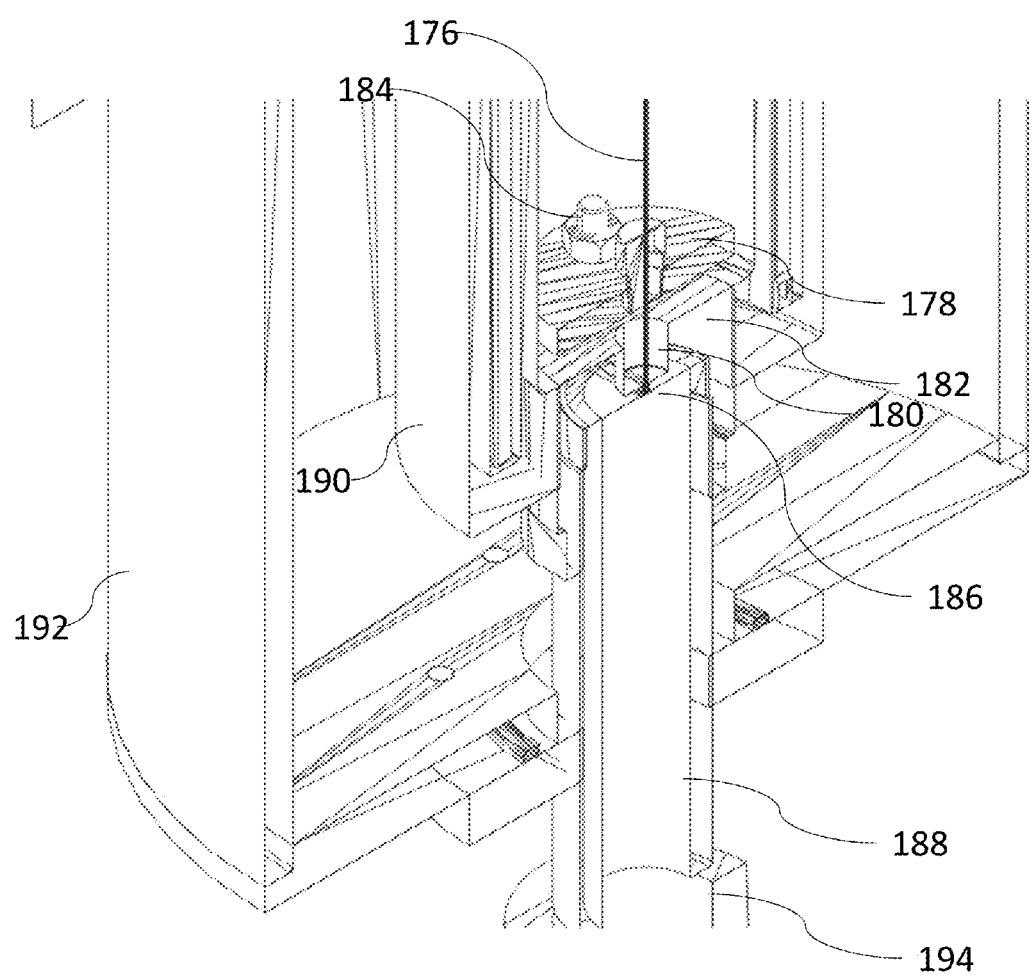
FIG. 12 provides a detailed schematic cross-section diagram of a lower portion of a pressure vessel in accordance with embodiments.

As shown in greater detail in FIG. 12, in many embodiments while the gas tube (176) still passes through an upper nozzle assembly plate (178) and into a liquid material outlet (180) in a lower nozzle assembly plate (182), no spacers are used to separate the upper nozzle assembly plate and the lower nozzle assembly plates in this embodiment of the invention because the mechanical connection is achieved via a press fit or by threading components together. Moreover, a single nozzle assembly plate has replaced the upper and middle nozzle assembly plates of the embodiments described with respect to FIGS. 1a and 2. Instead, as shown in FIG. 12, adjustable threaded connections (184) allow for the positional adjustment of the gas tube relative to the nozzle assembly exit (186). Specifically, in many embodiments at least two on threaded connections would allow axial and radial adjustment of the gas tube relative to the nozzle assembly exit. In other embodiments, at least three threaded connections allow for an additional angular adjustment of the position of the gas tube relative to the nozzle assembly exit. In addition, in the exemplary embodiments an optional interface tube (188) has been added to transition between the liquid material reservoir/crucible (190), pressure vessel (192), cooling vessel (not shown) and finally into the cooling tube (interconnection shown at 194).

Figure 13:
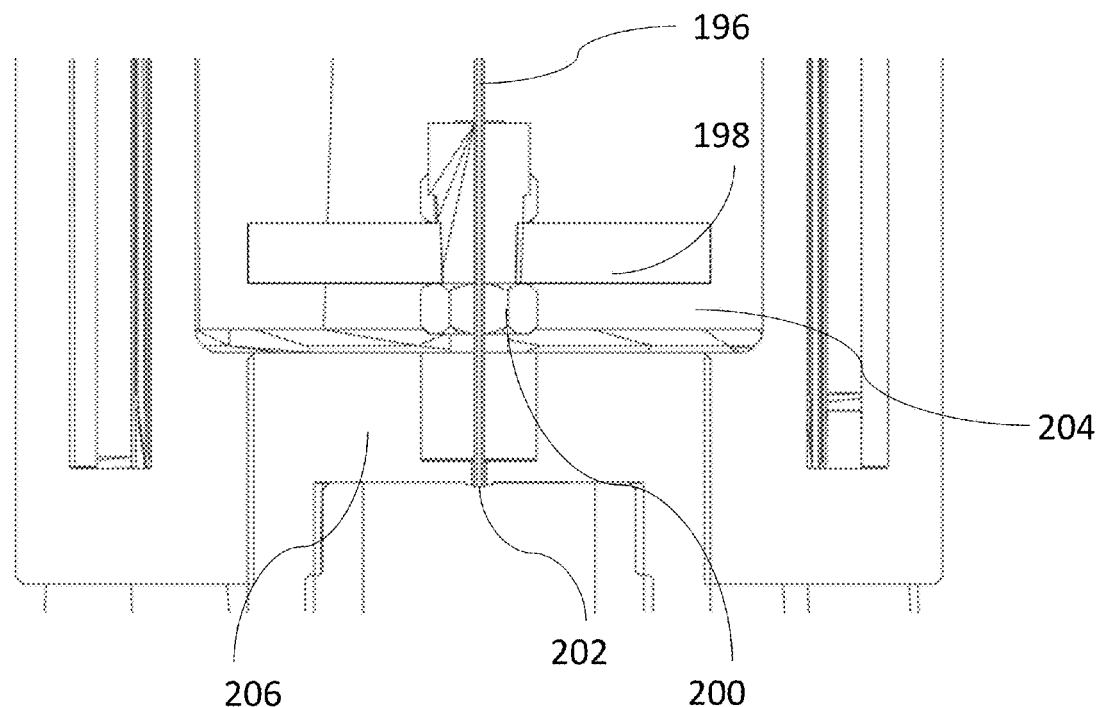
FIG. 13 provides a detailed schematic cross-section diagram of a nozzle assembly in accordance with embodiments.

In addition, in many embodiments, as shown in FIG. 13, the gas tube (196) is affixed within the upper nozzle assembly plate (198) via a compression fitting or collet (200) that allows for facile adjustment of the longitudinal alignment of the gas tube relative to the annular exit (202) of the nozzle assembly. In some embodiments use of a compression fitting may require machining the gas tube to have threads at the interface with some elements of the nozzle assembly and be a smooth surface at the interface with the compression fitting. The combination of the compression fitting and the threaded connectors also allow for the adjustment of the fluid opening (204) between the upper (198) and lower (206) nozzle assembly plates, thereby allowing for the adjustment of the flow of liquid material to and through the annular exit. Accordingly, the gas tube can be adjusted to correct for radial, axial and angular (i.e., non-normality) misalignments with respect to the annular exit of the nozzle assembly.

Figure 14:
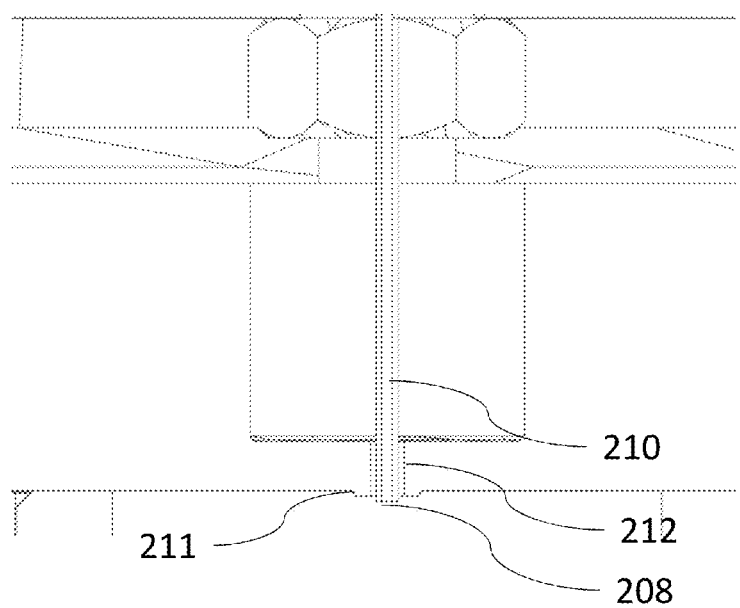
FIG. 14 provides a detailed schematic cross-section diagram of a nozzle assembly outlet in accordance with embodiments.

As shown in greater detail in FIG. 14, the nozzle assembly exit (208) includes the outlet of the gas tube (210) and an annular region formed between an edge of the liquid material outlet (212) and the outer wall of the gas tube. In some embodiments, this annular region can be open to the interface tube (188) and a substantially coaxial flow of liquid material and gas at appropriate rates results in a formation of bubbles which fall through the interface tube and begin to cool. In many embodiments the nozzle assembly exit hole (208) is provided with a raised lip (211) surrounding the exit. In various embodiments such a raised lip allows for better formation of a meniscus from the liquid material which can be used to form bubbles.

Although many of the figures show an outlet configuration where the gas and liquid material outlets are flush (e.g., having an approximately co-terminus in the longitudinal direction), in many such embodiments, as shown for example in FIGS. 13 and 14, a flush coaxial tube configuration co-locates the liquid material outlets and gas outlets on the same plane or allows the gas outlet to protrude slightly beyond the liquid material outlet. The flush coaxial tube configuration is used in many embodiments for forming hollow spheres from low viscosity fluids <10 poise or where large liquid material outlet diameters >0.03 inches are used. Alternatively, in other embodiments a retracted coaxial tube configuration may be used, which retracts the gas outlet by a distance > the diameter of the liquid material outlet from the plane formed by the liquid material outlet. Such retracted coaxial tube configurations may be used in many embodiments for forming hollow spheres from high viscosity fluids >10 poise or where small liquid material outlet diameters <0.03 inches are used, although it may also be used for forming hollow spheres from low viscosity fluids <10 poise or where large liquid material outlet diameters >0.03 inches are used. In many such embodiments of a retracted coaxial tube configuration, gas outlet diameters smaller than or equal to the liquid material outlet diameter may be used.

Figure 15:
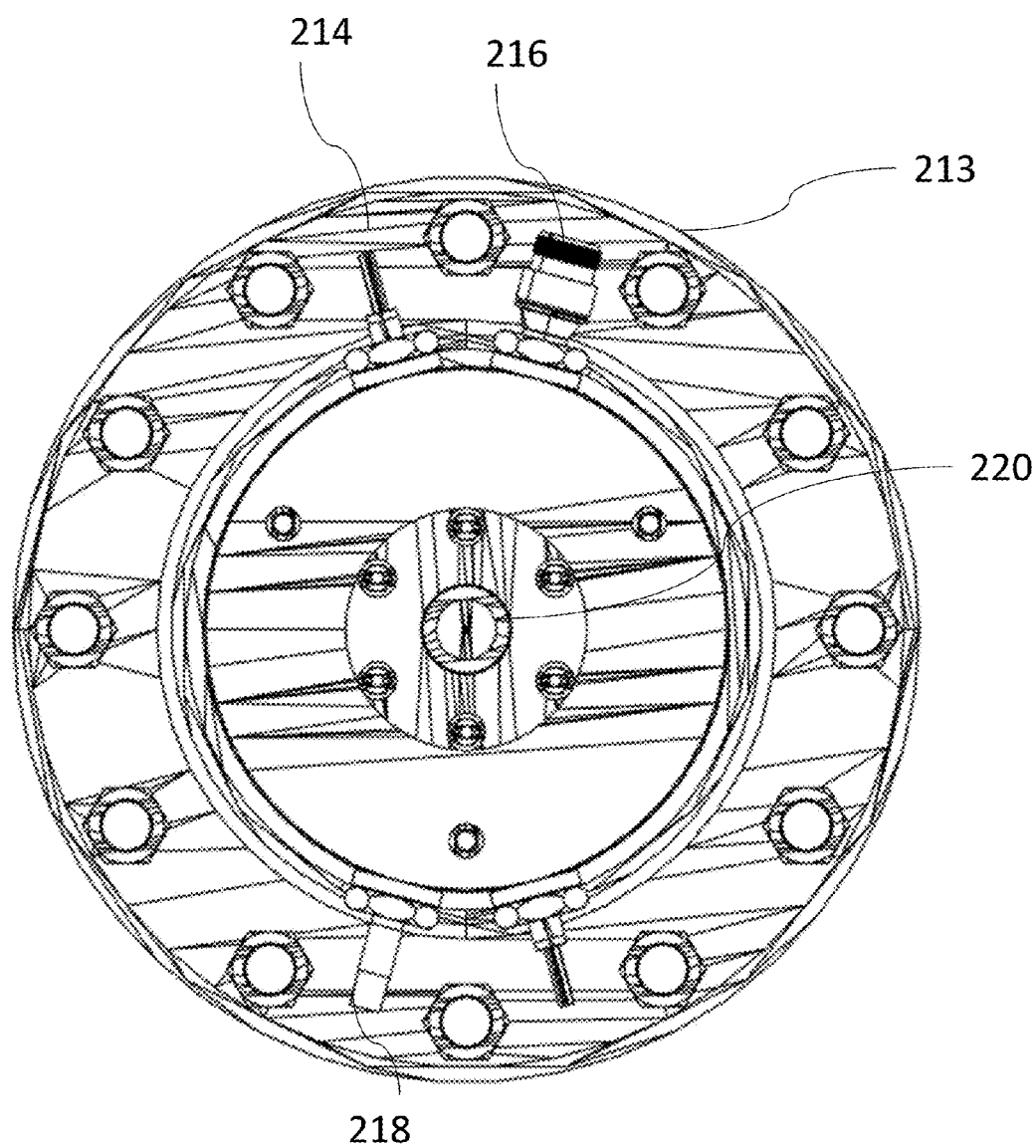
FIG. 15 provides a schematic top view diagram of a pressure vessel in accordance with embodiments.

As shown in greater detail in FIG. 15, a variety of feed-throughs may be disposed through the pressure vessel (213), such as electrical feed-throughs (214), thermocouple feedthroughs (216) and high pressure (218) gas feedthroughs, and hollow sphere exit feed-throughs (220). Although, as described above, in many embodiments separate high and low pressure gas feed-throughs may be provided, in many other embodiments high pressure and low pressure gas may be introduced through a single feed-through in exemplary high pressure vessel sealing plate. In addition, although in the exemplary embodiment shown feed-throughs are provided in the top portion of the pressure vessel around the circumference thereof, it should be understood that any number and configuration of such feed-throughs as well as viewports, valves, etc. may be provided as will be understood by those skilled in the art.

Figure 16:
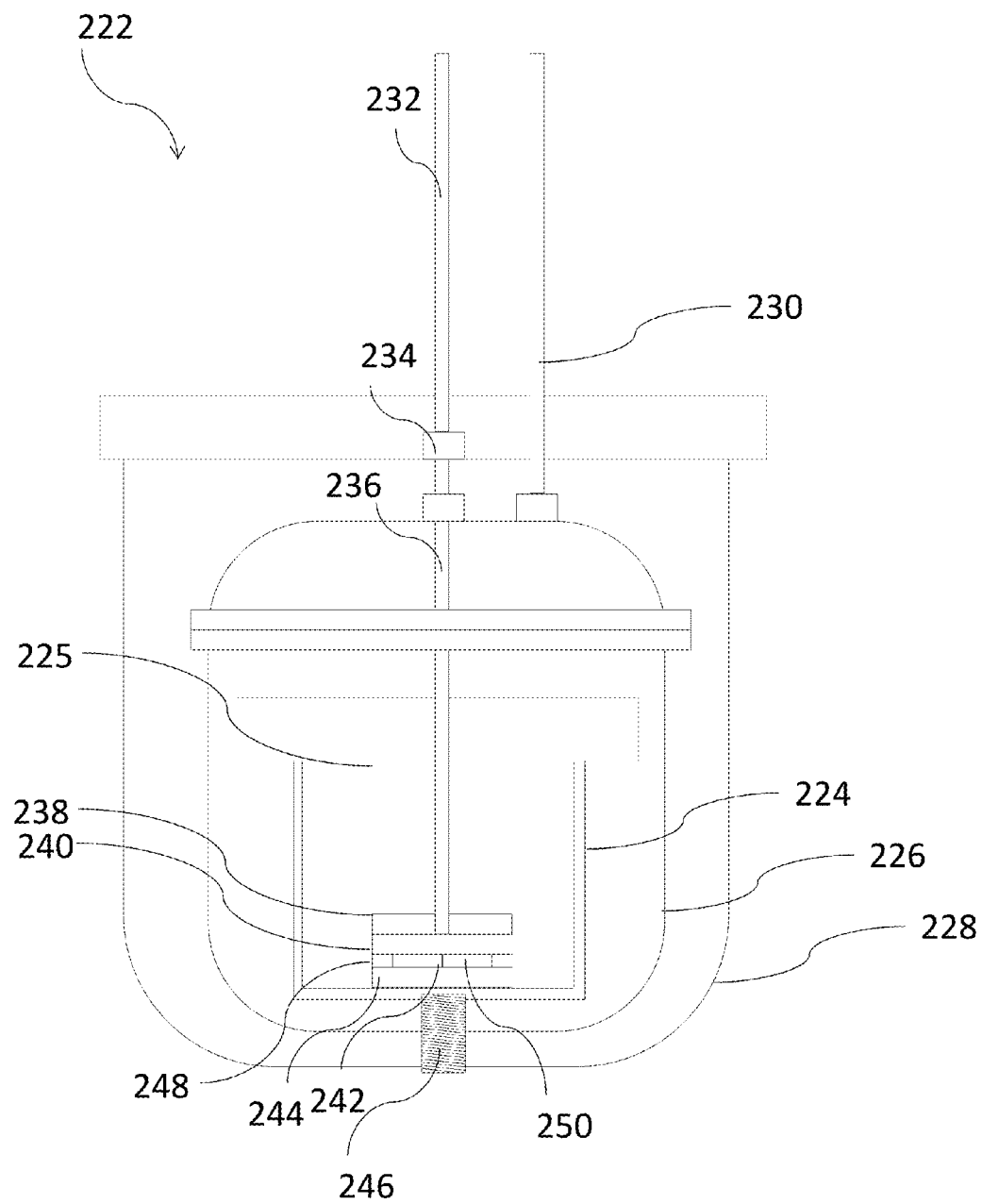
FIG. 16 provides a schematic cross-section diagram of a hollow sphere forming apparatus in accordance with embodiments.

Although the above discussion has focused on exemplary embodiments of hollow sphere forming apparatus, embodiments are also directed to methods of forming hollow spheres. Embodiments of methods will be described with reference to FIGS. 16 and 17. FIG. 16 provides a schematic cross-section diagram of an exemplary hollow sphere forming apparatus (222) comprising a liquid material reservoir (224) disposed in hydrostatic balance (e.g., with an opening (225) to the pressure vessel atmosphere) within a pressure vessel (226), which itself is surrounded by a cooling vessel (228). A high pressure gas tube (230) is provided to pressurize the pressure vessel. A low pressure gas supply tube (232) is provided in fluid connection via a suitable interconnection (234) to a gas inlet tube (236). (It should be understood that in many embodiments these gas tubes may comprise a single unitary tube.) The gas inlet tube passes into the pressure vessel and through the liquid material reservoir to an upper nozzle assembly plate, which in this embodiment comprises two adjacent plates (238 and 240) which fluidly interconnect the gas inlet tube with a gas outlet tube (242)(it should be understood that in many embodiments the inlet and outlet tubes may be a single unitary tube) that has an outlet disposed substantially coaxially within a liquid material exit (not shown) disposed within a lower nozzle assembly plate (244), thus providing a fluid path between the gas supply and a nozzle assembly outlet, which collocates the gas and liquid material outlets in an annular arrangement at an outlet tube (246). Spacers (248) are provided between the upper and lower nozzle assembly plates such that a fluid passage (250) is provided between the liquid material reservoir and the liquid material outlet in the lower nozzle assembly plate such that gas can pass into the middle of a liquid material flow and form hollow spheres therefrom. The hollow sphere thus formed pass out of the pressure vessel (226) and cooling vessel (228) through the outlet tube (246) to be collected as desired. In many embodiments the modular arrangement of the gas tube relative to the liquid material outlet and all the supporting components attached thereto, allow for the adjustment of the relative position of the gas tube outlet and liquid material outlet (e.g., radially, axially and angularly) such that an optimized coaxial configuration can be attained.

It should be understood that FIG. 16 has been included to show exemplary views and potential embodiments of the invention. These drawings are not intended to indicate a single configuration or limit the scope of the invention. For example, in other embodiments a variety of cross-sections may be used for the various components of the apparatus. Likewise different numbers and configurations of components may be provided without departing from the scope of this disclosure, including, but not limited to, different number and placements of gas tubes, sphere outlets, crucibles, pressure vessels, cooling vessels, cooling tubes, attachments, feed-throughs, viewports, valves, heating elements, adjustment elements, etc.

Figure 17:
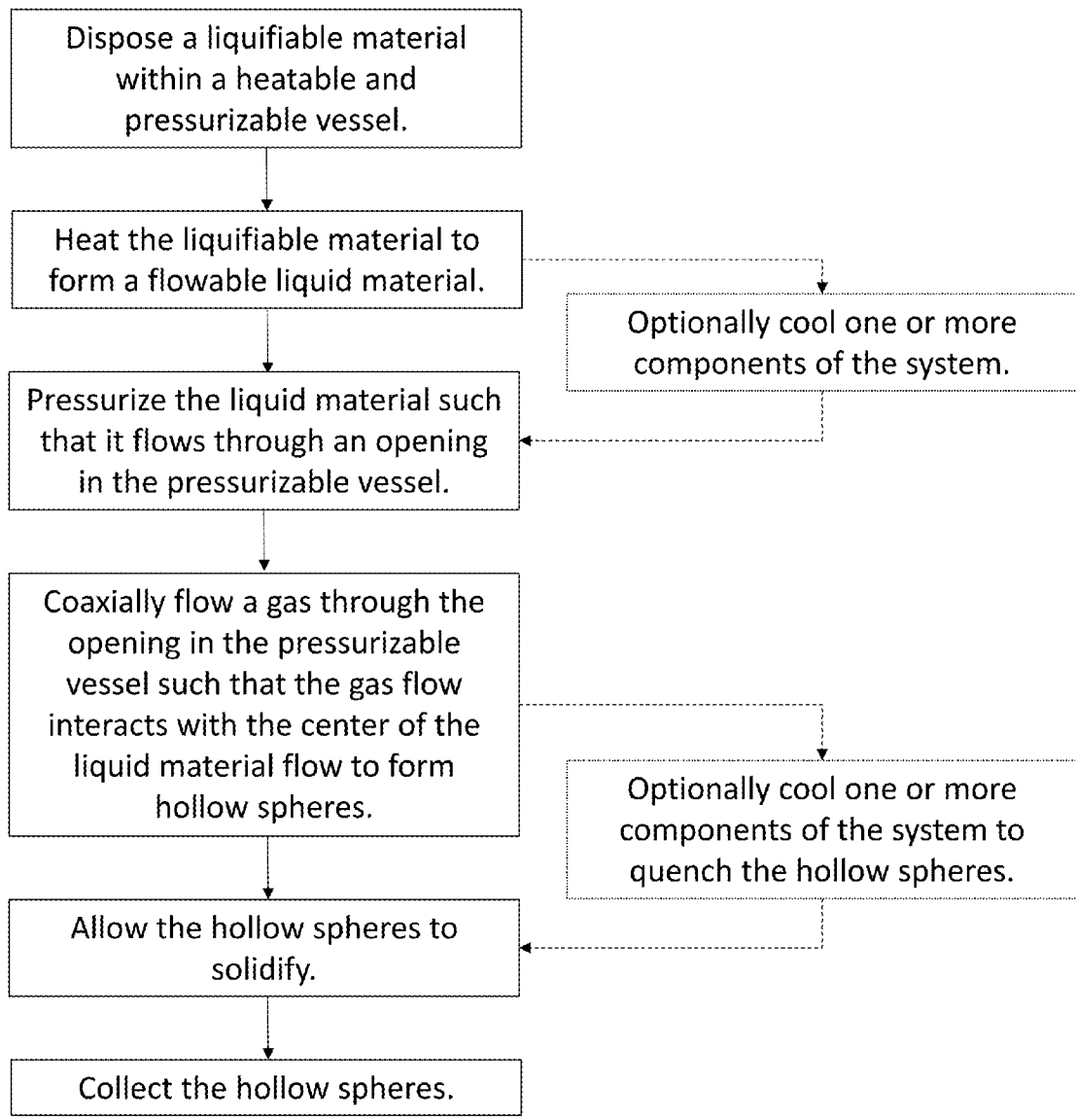
FIG. 17 provides a flow-chart of a method of forming hollow spheres in accordance with embodiments.

Regardless of the specific design of the hollow sphere apparatus, as summarized in FIG. 17, during operation a liquid material suitable for forming hollow spheres, such as metals, glasses, metallic glasses, ceramics, composites, etc. is disposed within the liquid material reservoir. For materials that are solid at room temperature a heated crucible may be provided within or around the liquid material reservoir to melt the chosen material to a liquid state.

The liquid material is placed in fluid communication with at least one outlet that has a gas outlet disposed substantially coaxially therewith. A driving force is then provided to initiate a flow of liquid material through the outlet. In many embodiments the driving force may be applied by pressurizing the atmosphere around the liquid material reservoir, such as by pressurizing a high pressure vessel in which the liquid material reservoir is disposed.

Once a liquid material flow has been initiated a flow of gas is initiated and directed such that the gas exits via an outlet that is disposed substantially coaxially with the flow of liquid material such that the exiting gas passes into and extrudes a plurality of hollow spheres from the flowing liquid material. It should be understood that this order may be reversed in some embodiments. Specifically, where the gas outlet is retracted in relation to the liquid material outlet gas bubbles, in many embodiments gas is not introduced into the liquid material before it is flowing out nozzle, however, in a case where the gas and liquid nozzle outlets are flush or the gas outlet protrudes from the outlet of the liquid material, an initial gas flow may be established to keep liquid out of gas tube (when using non-liquid tight threading). It will also be understood that the size, shape and physical parameters of the hollow spheres may be controlled by altering the relative flow of the gas and liquid material, such as is described, for example, in U.S. Pat. Nos. 4,344,787, 4,670,035, 4,960,351 and 4,643,854, the disclosures of which are incorporated herein by reference.

The hollow spheres may be quenched and/or processed in a controlled environment (e.g., temperature, pressure, atmosphere, etc.) as required for the particular application.

In cases where a crucible is used or where materials need to be heated to high temperatures that might damage other components of the apparatus a cooling material may be disposed around critical elements, such as, for example, the pressure vessel to prevent the components from overheating.

It should be understood that the above steps are provided as exemplary, other steps or the order of the steps may be altered (as will be understood) without departing from the scope of the disclosure.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A hollow sphere forming apparatus comprising:
a heatable liquid material reservoir defining a heatable inner volume;
at least one fluid outlet configured such that an inner opening of each of said at least one fluid outlet is in fluid communication with the heatable inner volume and an outer opening of each of said at least one fluid outlet is in fluid communication with an exterior of the heatable inner volume;
at least one upper nozzle plate at least partially disposed within the heatable inner volume above the at least one fluid outlet, the at least one upper nozzle plate having at least one tube retaining passage disposed therethrough;
at least one gas tube in fluid communication with a gas supply exterior to the heatable inner volume and secured within the at least one tube retaining passage such that at least an outlet end of the at least one gas tube is disposed within the at least one fluid outlet such that an annular opening is formed between an outer wall of the at least one gas tube and an inner wall of the at least one fluid outlet, and wherein the at least one upper nozzle plate is movably mounted within the heatable liquid material reservoir such that the radial position of the at least one gas tube relative to the at least one fluid outlet is adjustable; and at least three spacers disposed between the at least one upper nozzle plate and the at least one fluid outlet, and wherein the height of at least two of the at least three spacers are separably adjustable such that the axial and angular position of the at least one gas tube relative to the at least one fluid outlet is adjustable.

2. The hollow sphere forming apparatus of claim 1, further comprising a cooling tube having at least one opening disposed adjacent the outer opening of the at least one fluid outlet, and being of sufficient height to allow hollow spheres to cool and solidify therein during transit therethrough.

3. The hollow sphere forming apparatus of claim 2, wherein the cooling tube further comprises at least one device disposed along the length thereof selected from the group consisting of gauges, viewports, heating elements, cooling elements, valves, gas feed-throughs, electrical feed-throughs, and sealable openings.

4. The hollow sphere forming apparatus of claim 1, further comprising a cooling vessel defining a coolable inner volume, and wherein one or more elements of the apparatus are disposed within the coolable inner volume hollow sphere forming.

5. The hollow sphere forming apparatus of claim 1, wherein the at least one fluid outlet is disposed in a bottom nozzle plate disposed adjacent to outer walls of the liquid material reservoir heatable.

6. The hollow sphere forming apparatus of claim 5, wherein a pressurizable seal is formed between the bottom nozzle plate and the heatable liquid material reservoir, the pressurizable seal being selected from the group consisting of gaskets, knife edges, and mateable surfaces.

7. The hollow sphere forming apparatus of claim 1, wherein the at least three spacers are one or more washers or threaded rods.

8. The hollow sphere forming apparatus of claim 1, wherein one or more components of the hollow sphere forming apparatus disposed within the heatable inner volume are formed from materials selected from the group consisting of tungsten, molybdenum, platinum, rhodium, tantalum, graphite or alloys or oxides or carbides of the materials listed.

9. The hollow sphere forming apparatus of claim 1, wherein at least a portion of the at least one gas tube is press fit into the at least one upper nozzle plate.

10. The hollow sphere forming apparatus of claim 1, wherein the at least one gas tube comprises a plurality of separate sections, and wherein at least two sections of the at least one gas tube are fluidly interconnected in the at least one upper nozzle plate.

11. The hollow sphere forming apparatus of claim 10, wherein at least one section of the at least one gas tube is press fit into the at least one upper nozzle plate and wherein at least one section of the at least one gas tube is threaded into the at least one upper nozzle plate.

12. The hollow sphere forming apparatus of claim 10, wherein the at least one upper nozzle plate comprises at least two separate and adjacently disposed interconnected plates.

13. The hollow sphere forming apparatus of claim 10, wherein the at least one upper nozzle plate is secured to the heatable liquid material reservoir in which it is co-located.

14. The hollow sphere forming apparatus of claim 13, wherein the at least one upper nozzle plate is secured via at least one threaded connector that passes through at least one thru hole disposed therethrough, and wherein the diameter of the at least one thru hole is larger than a diameter of the at least one threaded connector used therewith.

15. The hollow sphere forming apparatus of claim 1, wherein the heatable liquid material reservoir is adapted to maintain a temperature and liquid material contained therein at least 900° C.

16. The hollow sphere forming apparatus of claim 1, wherein the heatable liquid material reservoir is surrounded by at least one of a foil or at least one layer of insulation, either or both having a temperature resistance greater than at least from 900° C.

17. A hollow sphere forming apparatus comprising:
a pressurizable vessel defining a pressurizable inner volume;
a heatable liquid material reservoir defining a heatable inner volume, the heatable liquid material reservoir being disposed within the pressurizable inner volume;
at least one fluid outlet configured such that an inner opening of each of said at least one fluid outlet is in fluid communication with the heatable inner volume and an outer opening of each of said at least one fluid outlet is in fluid communication with an exterior of the pressurizable inner volume;
at least one upper nozzle plate at least partially disposed within the heatable inner volume above the at least one fluid outlet, the at least one upper nozzle plate having at least one tube retaining passage disposed therethrough;
at least one gas tube in fluid communication with a gas supply exterior to the pressurizable inner volume and secured within the at least one tube retaining passage such that at least an outlet end of the at least one gas tube is disposed within the at least one fluid outlet such that an annular opening is formed between an outer wall of the at least one gas tube and an inner wall of the at least one fluid outlet, and wherein the at least one upper nozzle plate is movably mounted within the heatable liquid material reservoir such that the radial position of the at least one gas tube relative to the at least one fluid outlet is adjustable; and
at least three spacers disposed between the at least one upper nozzle plate and the at least one fluid outlet, and wherein the height of at least two of the at least three spacers are separably adjustable such that the axial and angular position of the at least one gas tube relative to the at least one fluid outlet is adjustable.

18. The hollow sphere forming apparatus of claim 17, further comprising a cooling tube having at least one opening disposed adjacent the outer opening of the at least one fluid outlet, and being of sufficient height to allow hollow spheres to cool and solidify therein during transit therethrough, and wherein the cooling tube is configured to be pressurized above or below atmospheric pressure at a pressure independent of the pressure within the pressurizable inner volume.

19. The hollow sphere forming apparatus of claim 17, further comprising at least one feed-through disposed through a wall of the pressurizable vessel, the at least one feed-through being selected from the group consisting of a heating element, a temperature gauge, a gas inlet, a pressure gauge, an electrical feed-through, a viewport, and a liquid or solid material feed-through.

20. The hollow sphere forming apparatus of claim 17, further comprising a cooling vessel defining a coolable inner volume, and wherein one or more elements of the hollow sphere forming apparatus are disposed within the coolable inner volume.

21. The hollow sphere forming apparatus of claim 20, further comprising at least two feed-throughs disposed through said coolable inner volume into the pressurizable inner volume, wherein each of the at least two-feed-throughs are in separate thermal contact with said coolable inner volume.

22. The hollow sphere forming apparatus of claim 17, wherein the at least one fluid outlet is disposed in a bottom nozzle plate disposed adjacent to one or both outer walls of the heatable liquid material reservoir and pressure vessel.

23. The hollow sphere forming apparatus of claim 22, wherein a pressurizable seal is formed between the bottom nozzle plate and one or both the heatable liquid material reservoir and pressurizable vessel, the pressurizable seal being selected from the group consisting of threaded connections, gaskets, knife edges, and mateable surfaces.

24. The hollow sphere forming apparatus of claim 17, wherein the at least one upper nozzle plate is secured to at least one of the heatable liquid material reservoir or pressurizable vessel in which it is co-located.

25. The hollow sphere forming apparatus of claim 17, wherein the pressurizable vessel is configured to be pressurized to at least 200 PSI.

26. The hollow sphere forming apparatus of claim 17, wherein the heatable inner volume is in hydrostatic balance with the pressurizable inner volume.

* * * * *